July 8, 1952
B. E. PHELPS ET AL
2,602,544
RECORD SORTING MACHINE
Filed June 30, 1945
9 Sheets-Sheet 1
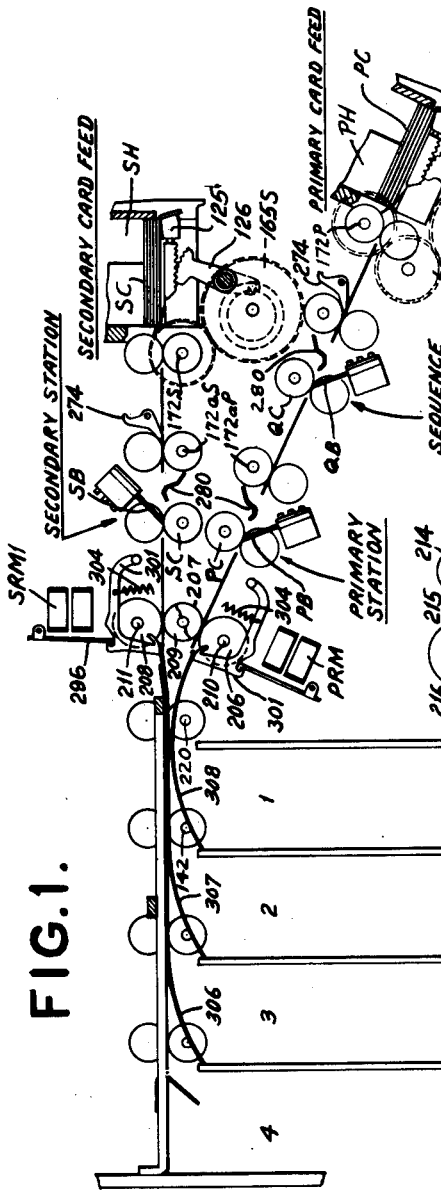
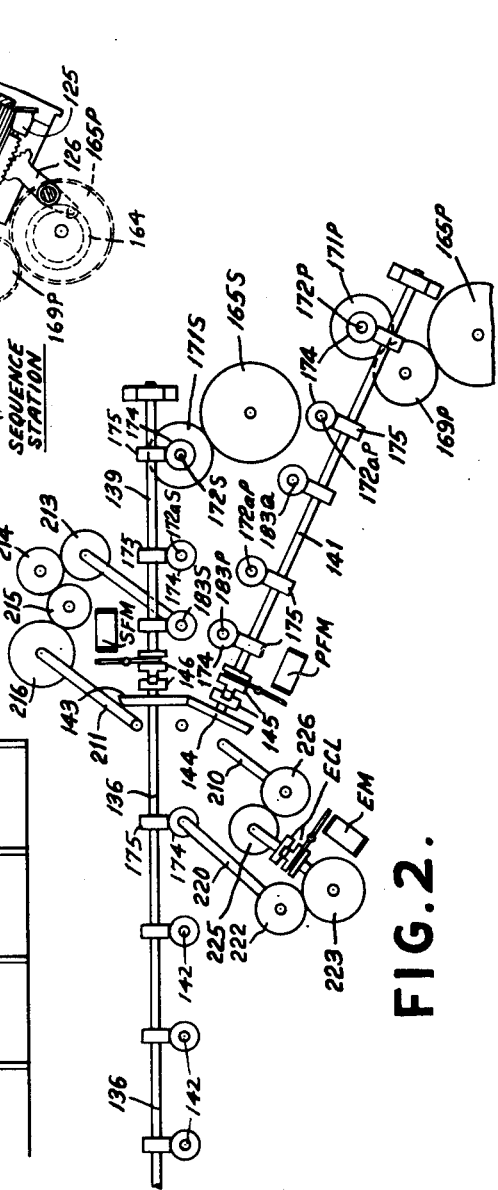
INVENTORS
B. E. PHELPS
J. D. HOOD
BY
ATTORNEY

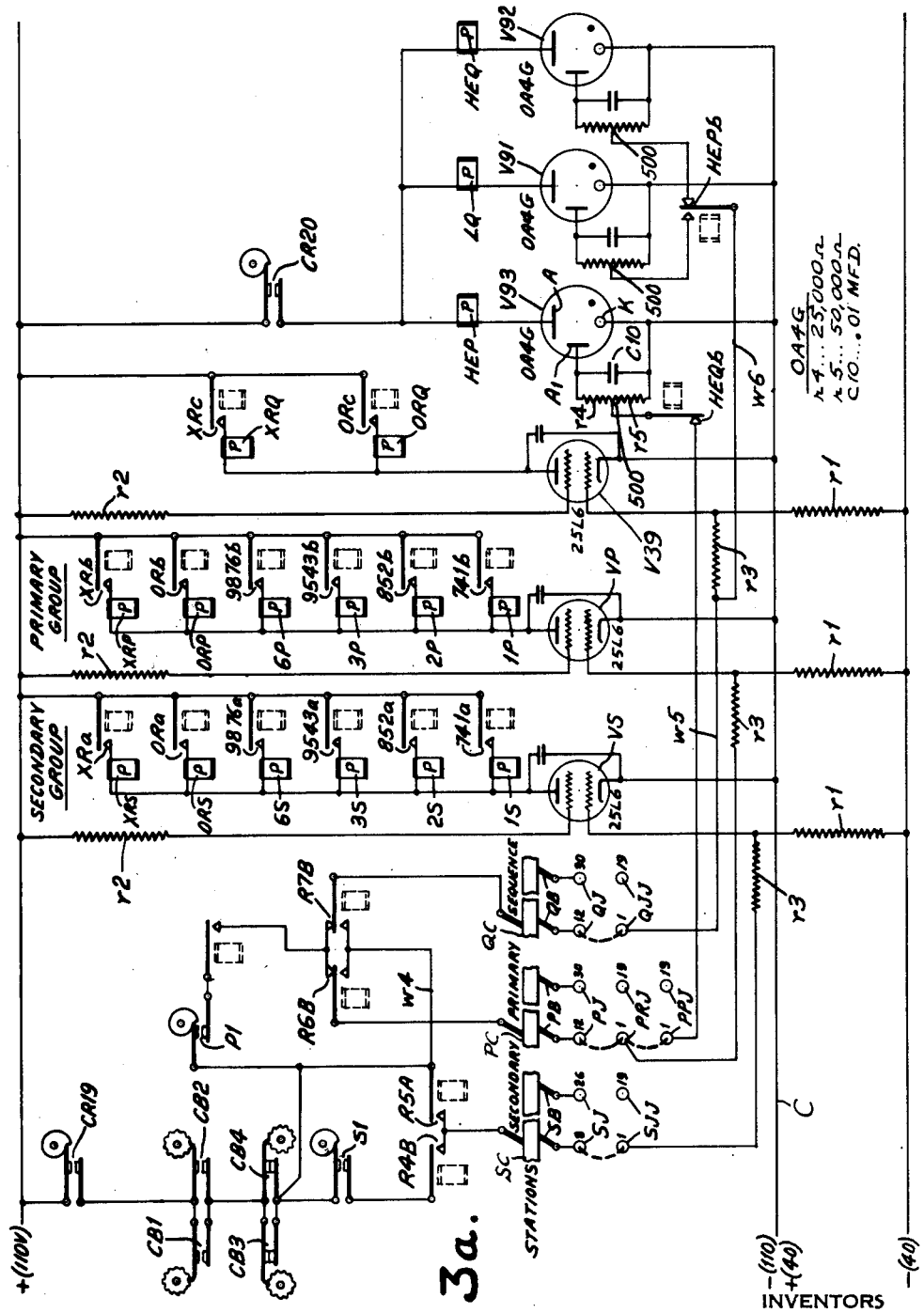

July 8, 1952

B. E. PHELPS ET AL 2,602,544

RECORD SORTING MACHINE

Filed June 30, 1945

INVENTORS
B. E. PHELPS
J. D. HOOD
BY
ATTORNEY

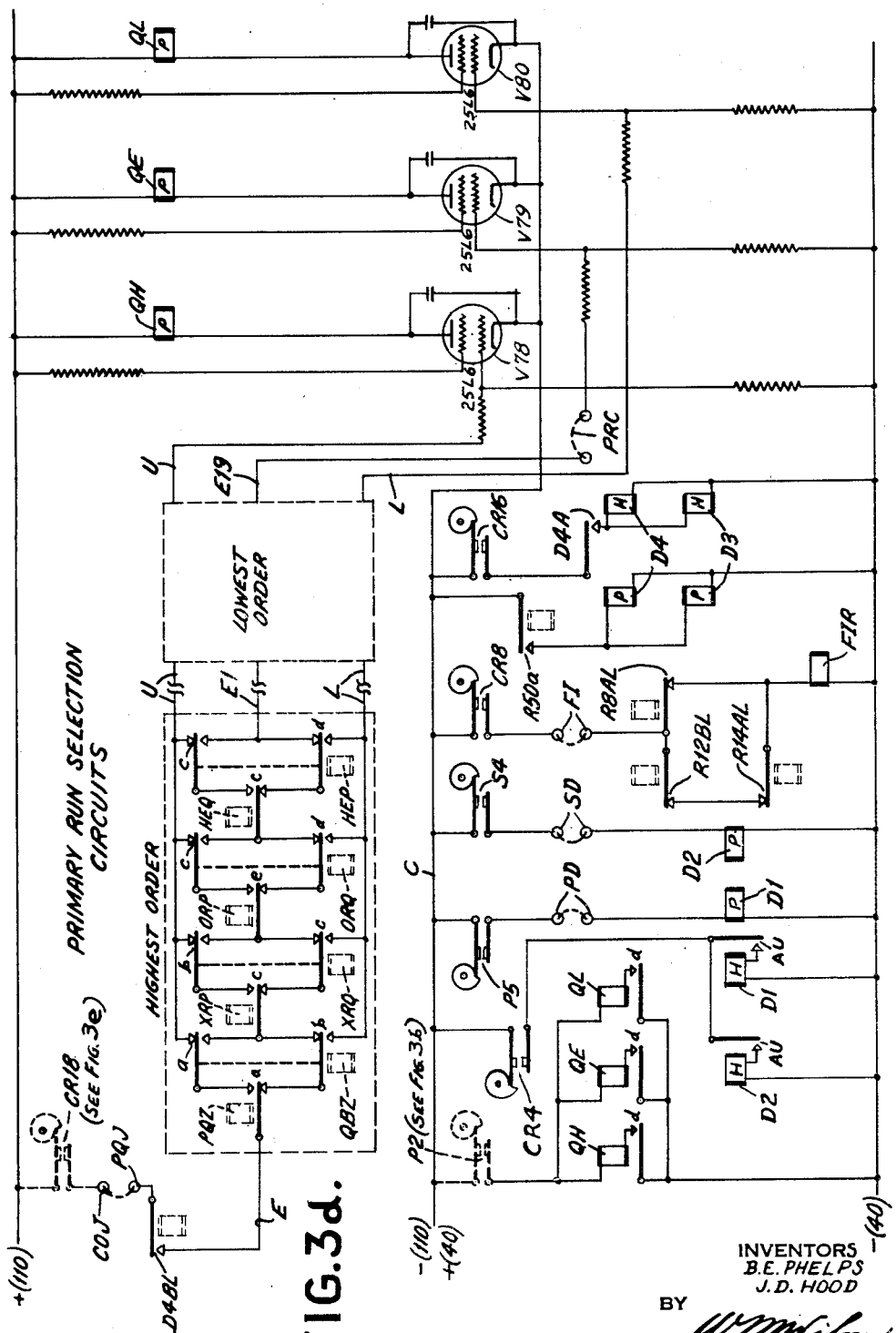

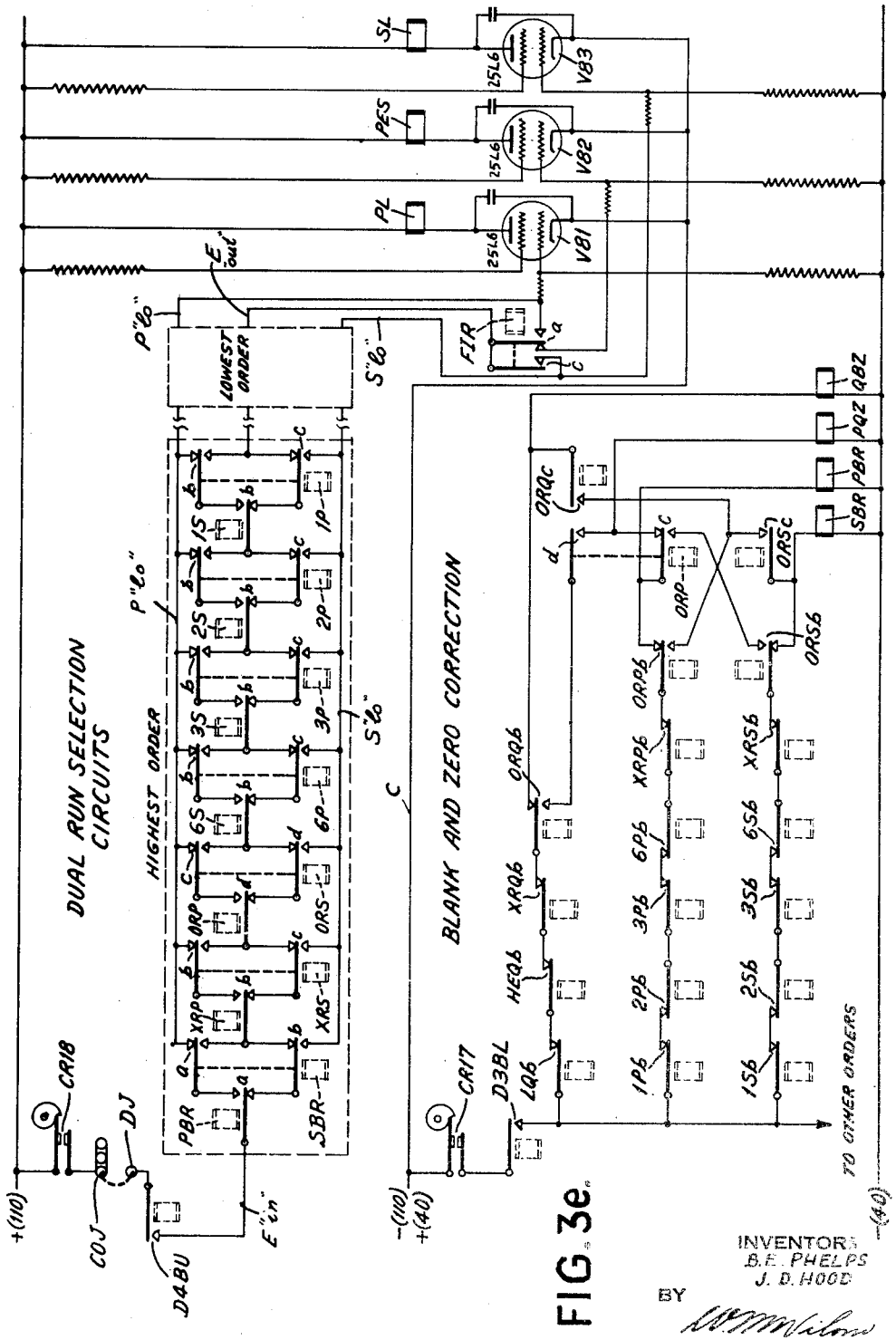

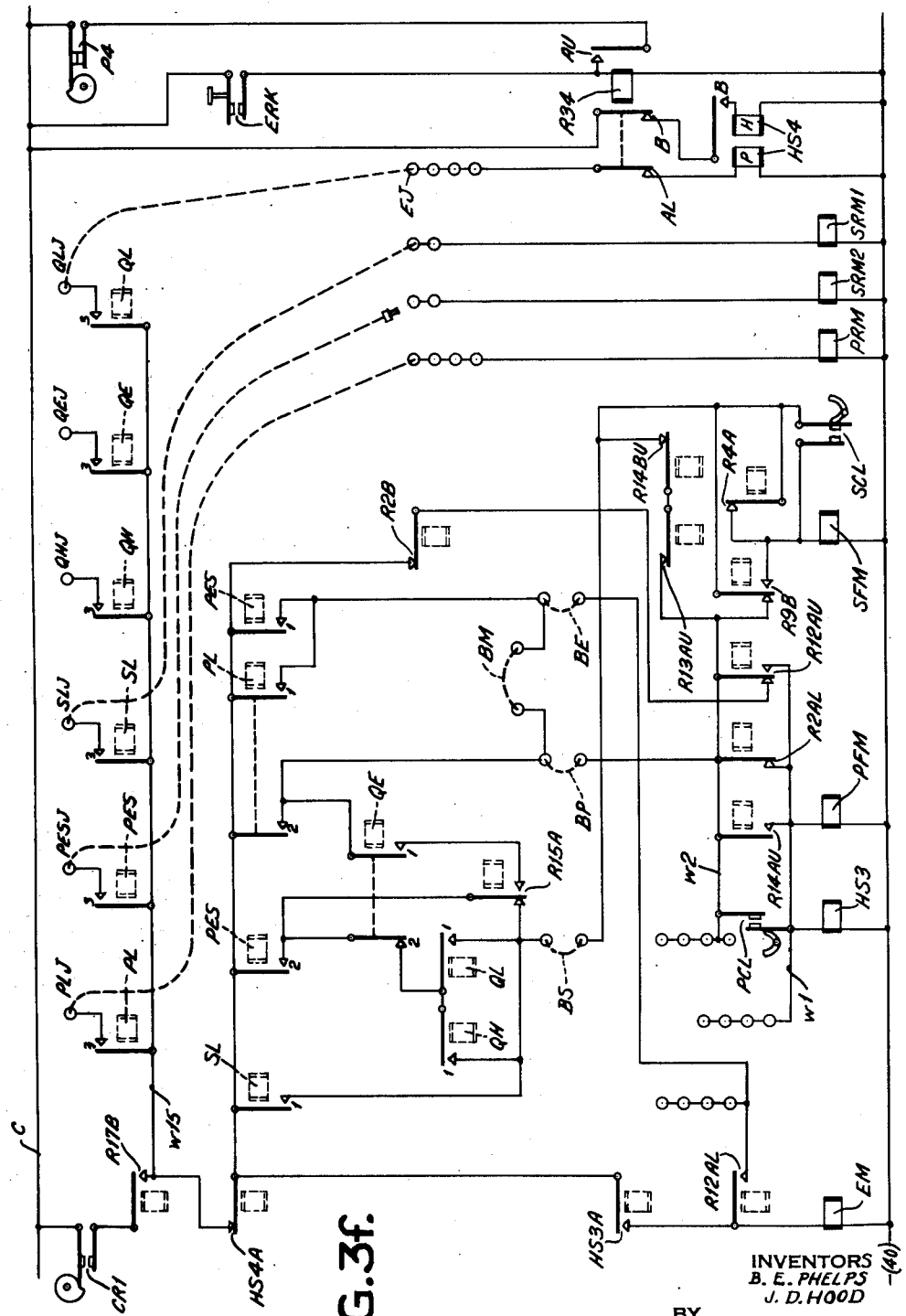

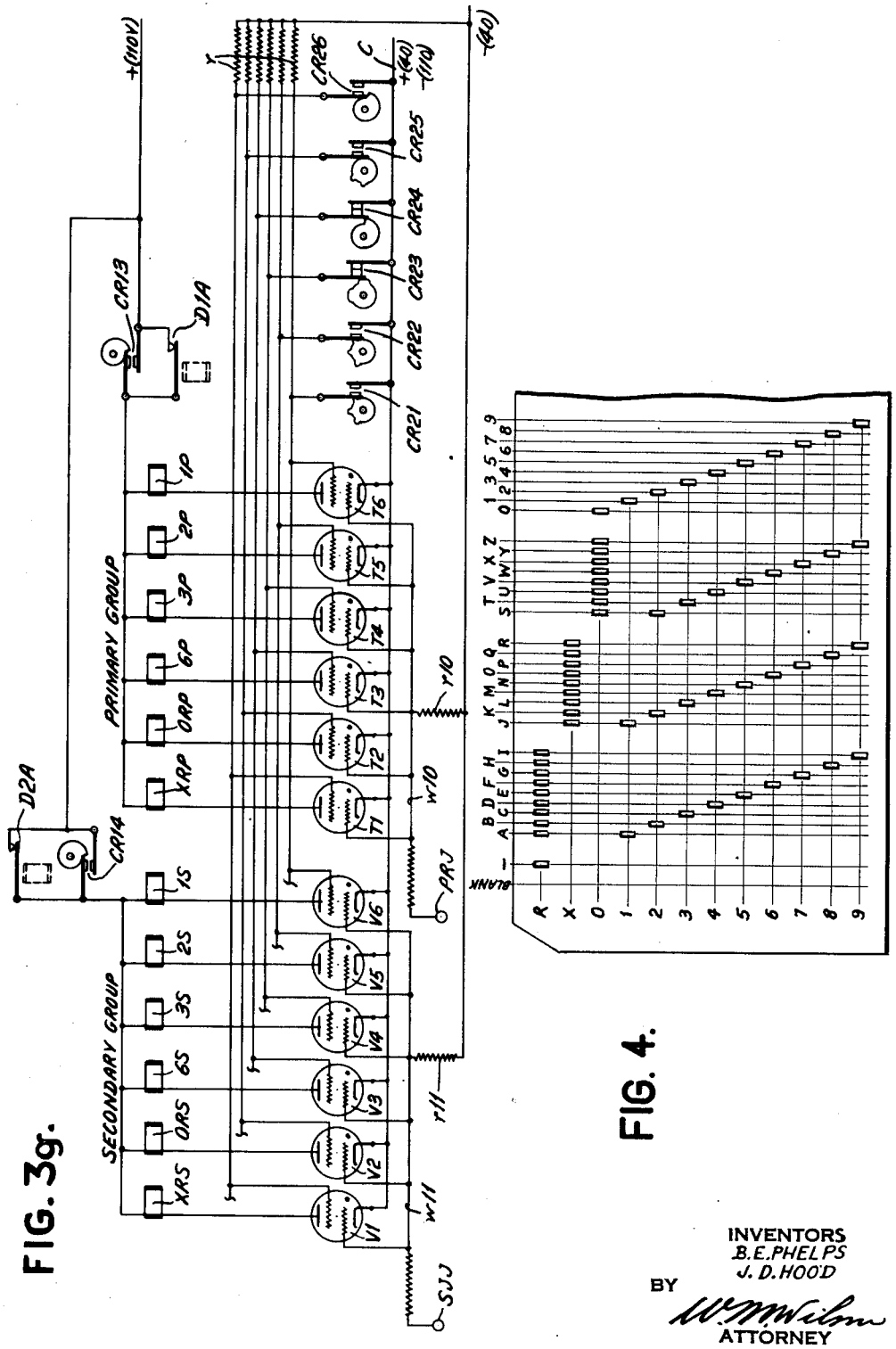

Patented July 8, 1952

2,602,544

UNITED STATES PATENT OFFICE 2,602,544

RECORD SORTING MACHINE

Byron E. Phelps, Endicott, and James D. Hood, Endwell, N. Y., assignors to International Business Machines Corporation, New York, N. Y., a corporation of New York Application June 30, 1945, Serial No. 602,494

13 Claims. (Cl. 209—110)

This invention relates to record card distributing or collating machines of the kind disclosed in Patent No. 2,359,670.

In said patent is disclosed a collator operating on cards bearing numerical information. A principal object of the present invention is to provide novel means for operating a collator or the like not only according to numerical information on cards but also according to alphabetic information or alphabetic-numeric information on the cards.

Alphabetic characters are designated by combinational pairs of marks in a column of the record card. Such marks are perforations in the present case and are located selectively in index positions of the columns of the cards. The numbers 0 to 9 are designated by single perforations in corresponding index positions of the columns, only one perforation being made in one column. The index positions 1 to 9 are known as the numeric or intrazone positions. The index positions R, X, and 0 are known as the zone positions. Alphabetic characters are designated by a perforation in a zone position combined with a perforation in a numeric position. It is seen that the numeric perforations may occur alone or in combination with zone perforations. Also, the 0 perforation may occur alone or in combination. The R hole in combination with a numeric perforation represents a letter but when it occurs alone it represents the dash symbol in the present case. In brief, the perforations, except for the X perforation in this case, have an alternative codal significance depending on whether they occur in combination or singly. Further, in the present case, a blank column also has a value significance since it may represent, for instance, a letter spacing function. It is required in the collator to compare the information on a pair of cards. One difficulty is that the comparison must take into account not only the positional significance of a perforation but whether it occurs in combination or alone. A corollary difficulty arises from the fact that a mark has one value in a scale when it occurs alone and shares in defining a different value in the scale when it occurs in combination. Further difficulties arise from the use of a blank column as a value in the scale and from the use of the 0 and R perforations as elements of the code.

Stated broadly, an object of the invention is to overcome the aforementioned difficulties so that the comparison result may be consistent with a prescribed scale of values of characters composing the alphabetic, numeric, or alphabetic-numeric information designated on the cards.

More specifically, an object is to collate records according to the relative magnitude, within a prescribed scale of values, of alphabetic or alphabetic-numeric or numeric data derived from records to be collated.

An object is to provide means supplementing the comparing means to produce a comparison result consistent with the prescribed scale.

An object is to provide means controlled by special designations derived from the record cards for supplementing means controlled by any of the designations derived from the record cards in comparing the data represented by the designations.

More specifically, the special designations are the blank column, 0 and R designations, whence an object of the invention may be stated to reside in the provision of blank and 0, R correction means for assisting in the comparison of combinational codal data in accordance with a prescribed scale of values. Hereinafter, for the sake of brevity and simplicity, such correction means will be referred to as the blank and zero correction means.

It is also an object of the invention to arrange electronic means in various circuits, including the comparison circuits, for promoting the speed and facility of operation of the machine.

In comparing data derived from denominationally related card columns, it is required that the relation of the values in the higher denominations dominate the relation of values in the lower orders. Comparison circuits, each for a different denomination, are therefore connected in tandem to control comparison result means. However, if any of the higher order circuits finds that one value is greater than the other, then current is led directly from this circuit to the result means, by-passing the succeeding circuits. It is seen then that the number of comparison circuits through which the current may flow to the result means is variable. Since the circuits have electrical resistance, it follows that the resistance for impeding the flow of current to the result means may vary. Consequently, the result means, usually relay windings, may have a variable response. Previously, this fact has limited the number of denominational circuits which may be provided in the comparing circuit. In other words, the number of denominationally related columns to be compared have been limited by the minimum factor of response of the result relays.

An object of the present invention is to provide means whereby the number of denominationally related columns to be compared may be increased by providing electronic means having a grid electrode for receiving the output of the comparing circuit network. Such electronic means responds sensitively to changes in potential on the grid and are substantially independent of variations in current flowing in the output of the comparing network.

Another object of the invention is to provide novel electronic circuit means for operating value storing means under control of combinational codal data designations on records.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a somewhat diagrammatic view of the collator machine.

Fig. 2 is a substantially diagrammatic view of the drive elements in the collator machine.

Figs. 3a, 3b, 3c, 3d, 3e, and 3f are circuit diagrams of the machine.

Fig. 3g is a circuit diagram showing a modification of the card-controlled value storing circuits, using gas-filled electron tubes.

Fig. 4 shows a portion of the record card punched to indicate the code.

Figure 5:
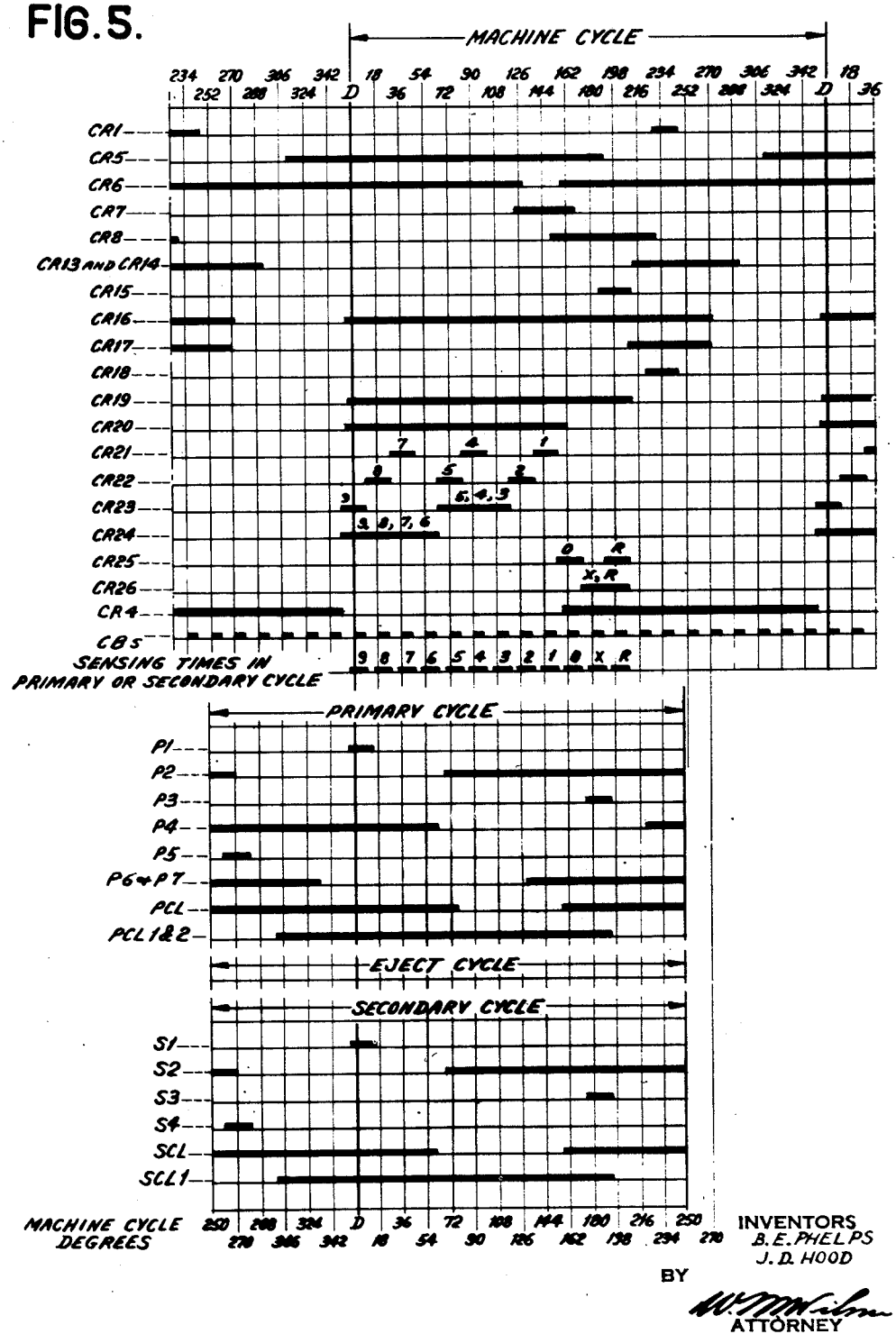

Fig. 5 is a timing chart.

1. The cards, the code, and value relation

The cards are of a common type used in tabulating machines and related apparatus. They may be punched with alphabetic or numeric data or both. Fig. 4 shows a card punched with all the possible characters required to be designated in the particular combinational code employed here. A card column has twelve index or perforation positions 9, 8, 7 ... 1, 0, X, and R. A single perforation in a column in position R designates the dash symbol. A single perforation in a column in one of the positions 0 to 9 represents the corresponding number 0 to 9. A perforation in position R combined with a perforation in one of the positions 1 to 9 represents one of the letters A to I. An X hole combined with one of the perforations in positions 1 to 9 represents one of the letters J to R. A 0 hole combined with a perforation in one of the positions 2 to 9 represents one of the letters S to Z.

All the symbols have a prescribed order of magnitude within a chosen scale of values. The ascending order of magnitude is as follows:

Blank column (which may denote a space).
The—symbol (R perforation).
Letters A to Z.
Numbers 0 to 9.

An example of cards collated by the present machine in proper order is given below:

```
AAF62343
AAF628432
AAG17954
EX38141-13
EX381417
1001D3-17500
1001D5-680
1035D3
```

It is to be understood that the cards are placed in hoppers PH and SH (Fig. 1) face down and with the 9 index position leading; i. e., nearest the exit or throat of a hopper.

The index positions 0, X, and R may be called the zone positions, and the index positions 1 to 9 may be called the intrazone positions. It is important to note that a perforation in the 0 position when unaccompanied by another perforation in the same column is representative of the cipher, but when accompanied by a perforation in one of the positions 2 to 9 is part of a letter representation. Also, the R hole, alone, represents a dash, but together with an intrazone hole it is representative of a letter. In other words, the R and 0 holes as well as the intrazone holes vary in significance depending on whether they occur singly or in combination.

2. The mechanical structure

Figs. 1 and 2 diagrammatically show the mechanical structure of the machine. Cards placed in primary hopper PH are designated PC and called primary cards. Cards in secondary hopper SH are designated SC and referred to as secondary cards. Pickers 125 are adapted to feed cards out of the hoppers. The pickers have rack teeth meshed with gear segments 126 which are oscillated by box cams 164 rigid with gears 165P and 165S. Gear 165P, in the primary side, is driven through an idler 169P by a gear 171P on a shaft 172P. Gear 165S, in the secondary side, is driven directly by a gear 171S on a shaft 172S. Shaft 172P and two similar shafts 172aP in the primary side are feed roller shafts. These shafts and two contact roll shafts 183Q and 183P in the primary side are driven through spiral gear pairs 174 and 175 by the primary shaft 141. Shafts 172S and 172aS in the secondary side are feed roll shafts, and these and a contact roll shaft 183S in the secondary side are driven by similar spiral gear pairs 174 and 175 from the secondary shaft 139. Shaft 139 may be clutched to continuously rotating main shaft 136 by a one-revolution clutch 146 brought into action by clutch magnet SFM. Similarly, primary shaft 141 is clutchable by a one-revolution clutch 145 to a bevel gear 144, upon energization of clutch magnet PFM. Bevel gear 144 is meshed with a bevel gear 143 on main shaft 136. Contact roll shaft 183Q, in the primary side, carries contact roll QC coacting with sensing brushes QB to sense primary cards passing through the Sequence station. The contact roll shaft 183P, in the primary side, carries contact roll PC coacting with sensing brushes PB to sense primary cards traversing the Primary station. The shaft 183S, in the secondary side, carries a contact roll SC to coact with brushes SB to sense secondary cards as they traverse the Secondary station.

With primary shaft 141 in operation, the related picker 125 will feed a card from the hopper PH. The card will be fed further by the feed rollers in the primary side to eject rolls 206 and 207. With secondary shaft 139 in operation, a card will be fed from the hopper SH by the related picker 125 and thence by the feed rollers to the eject rolls 208 and 209. The eject rolls 208 and 209 are driven by the secondary shaft 139 through a train of gears 213, 214, 215, and 216, of which gear 213 is secured to secondary contact roll shaft 183S and gear 216 to shaft 211 of eject roll 208. The primary eject rolls 206 and 207 are driven by the main shaft 136 through means including a one-revolution clutch ECL which is effective upon energization of eject clutch magnet EM. The driver element of the clutch carries a gear 223 meshed with a gear 222 on a shaft 220 which is driven through a spiral gear pair 174 and 175 by the main shaft 136. The driven element of the clutch carries a gear 225 meshed with a gear 226 on shaft 210 of eject roll 206.

Shaft 220 and three more, similarly driven shafts 142 carry feed rollers for coacting with feed rollers on companion shafts to feed the cards issuing from the eject rolls to a selected card pocket. There are four pockets to which the cards may be selectively distributed. The pockets are designated 1, 2, 3, and 4. There are three guide blades 306, 307, and 308 for directing cards to selected pockets. Blade 308 rests at the rear upon the toe of a lever 301 associated with a magnet PRM. With this magnet inactive, cards issuing from primary eject rolls 206 and 207 pass over the blade 308 into pocket 2. Upon energization of magnet PRM, it unhooks the related lever 301 allowing it to be moved upwardly by a spring 304 and thereby to lift the rear end of blade 308. A card issuing from eject rolls 206 and 207 will then pass under blade 308 into pocket 1. As disclosed in application Ser. No. 347,226, now Patent No. 2,379,828, the rear ends of blades 306 and 307 are transversely spaced apart. The rear end of top blade 306 extends under the toe of a lever 301 associated with a magnet SRM1, while the rear end of blade 307 extends under the toe of a similar lever (not shown) associated with a similar magnet SRM2 (shown only in the circuit diagram, Fig. 3f). With both magnets SRM1 and SRM2 deenergized, cards issuing from eject rolls 208 and 209 feed under blade 307 into pocket 2. With magnet SRM2 energized, blade 307 is depressed at the rear end to allow cards issuing from eject rolls 208 and 209 to pass over this blade and under blade 306 into the pocket 3. When magnet SRM1 is energized, it unhooks the lever 301 associated therewith and also the similar lever (not shown) associated with magnet SRM2, allowing attached springs 304 to rock these levers counterclockwise. Consequently, blades 306 and 307 are both depressed, and a card issuing from eject rolls 208 and 209 will pass over both blades into the pocket 4.

Figure 3B:
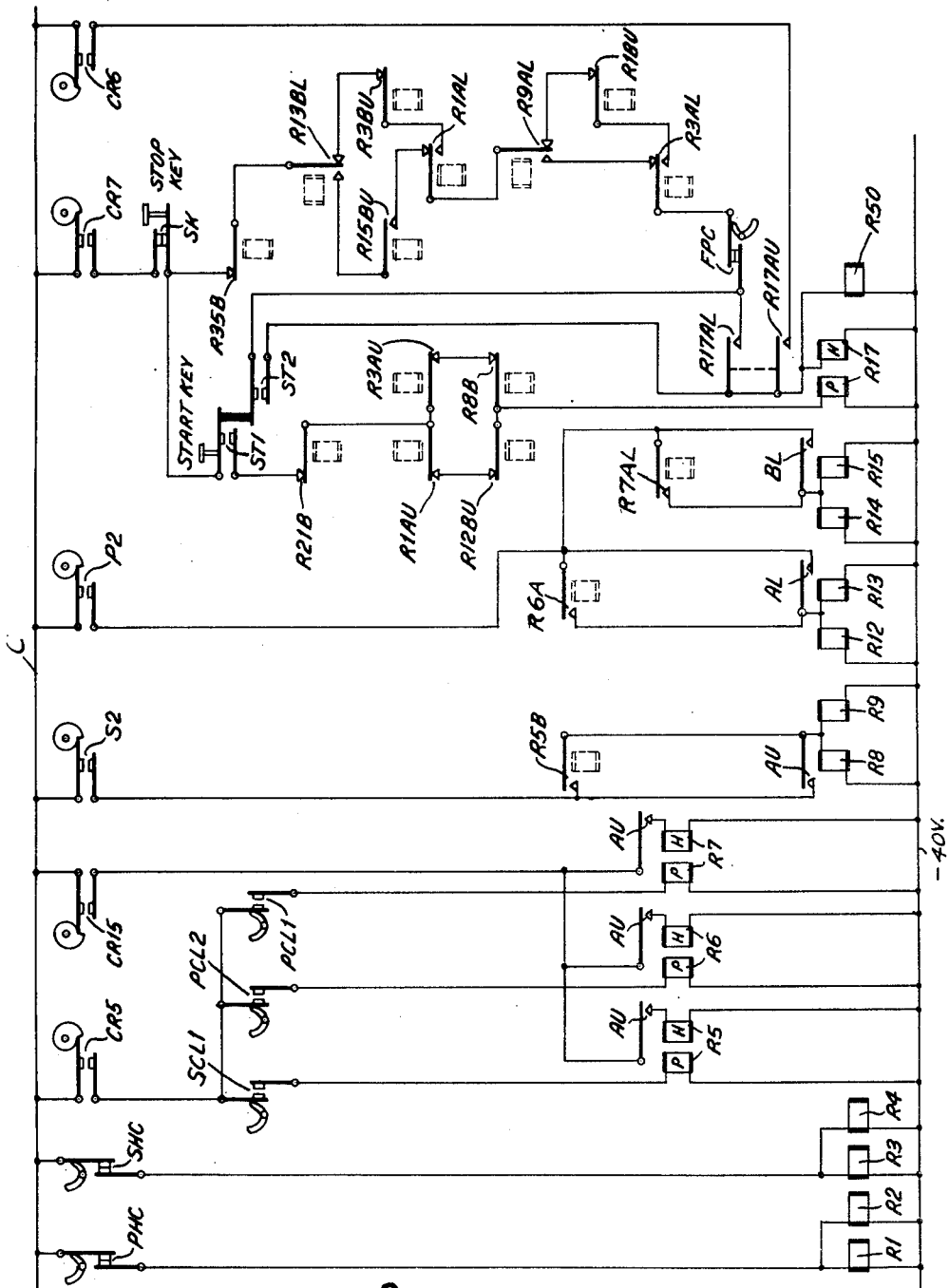

There are various card lever contacts, hopper contacts, cam contacts, etc. shown in the circuit diagrams (Figs. 3a to 3g). Briefly, as long as cards are in hoppers PH and SH (Fig. 1), hopper contacts PHC and SHC (Fig. 3b) are held open and magnets R1, R2, R3 and R4 remain unenergized. During a first cycle of the primary shaft 141, a first card will feed out of hopper PH to a position past the second pair of feed rolls in the primary side and behind the Sequence station. In advancing to this position, the card rocks a lever 274 (Fig. 1) to close contacts PCL (Fig. 3f). During a second cycle of shaft 141, the second card feeds from the hopper PH, while the first card is advanced through the Sequence station. During this advance, the first card rocks a lever 280 (Fig. 1) to close contacts PCL1 (Fig. 3b). During a third cycle of shaft 141, the first card is advanced through the Primary station to the eject rolls 206 and 207. In its advance through this station, the card operates a second lever 280 to close contacts PCL2 (Fig. 3b). Continuation of the feed of the card from the eject station to a selected card pocket 1 or 2 will depend on the energization of eject magnet EM.

During a cycle of secondary shaft 139 (Fig. 2), a card is fed from the hopper SH (Fig. 1) to a position behind the Secondary station, meanwhile operating a lever 274, in the secondary feed line, to close contacts SCL (Fig. 3f). During a following cycle of shaft 139, the card will be fed through this sensing station to the eject rolls 208 and 209, meanwhile operating card lever 280, in the secondary side, to close contacts SCL1 (Fig. 3b). During a third cycle of shaft 139, the card will be fed to a selected card pocket 2, 3, or 4.

As usual the sensing brushes are wired to plug sockets. Referring to Fig. 3a, the sockets wired to brushes SB are designated SJ and these may be plugged to chosen sockets SJJ which lead to elements of the controlled devices. The sockets wired to brushes PB are designated PJ and these may be plugged to chosen sockets PRJ and PPJ. Finally, the sockets QJ are wired to brushes QB and may be plugged to sockets QJJ. The pluggable connections are provided to allow for any chosen fields of card columns to be ultimately compared.

Various cam contacts shown in the circuit diagrams are of three classes. One class comprises continuously operating cam contacts including those given the general designation CR (see Fig. 5) and, also, the circuit breaker contacts, the CBs (see also Fig. 3a). A second class includes contacts operated only when the primary shaft 141 is running, and cam contacts in this class have the general designation P. The third class includes contacts operating only when the secondary shaft 139 is running, and these cam contacts have the general designation S. Several relays are of the common type having pick-up and hold coils operating on the same armature contacts. The pick-up coil will be identified by letters P inside the box representing the coil. The hold coil will be identified by a similarly placed letter H.

3. Circuits—general

There are two voltage lines, one at 110 D. C. and the other at 40 D. C. supplied from a suitable source. The negative side of the 110 D. C. line and the positive side of the 40 D. C. line are common. The common side is designated C.

Assume power is on the voltage lines, and that cards are present in the primary hopper PH and the secondary hopper SH (Fig. 1). Operation of the machine is initiated by depressing a start key (Fig. 3b). The closure of start key contacts ST1 establishes the following circuit:

*Initiating start key circuit.*—From the —40 v. side, through coil P(R17), normally closed relay contacts R12BU or R8B and R1AU or R3AU, thence via contacts R21B, key contacts ST1, stop key contacts SK, and cam contacts CR7, to the side C.

Contacts R17AU close, and together with cam contacts CR6 establish the circuit of coil H(R17) and of a parallel relay R50.

Relay contacts R17B (Fig. 3f) close, and the following circuit is then completed.

*PFM and HS3 circuit #1.*—From the —40 v. side, through parallel magnets PFM and HS3, to a wire w1, thence via contacts R2AL to a wire w2, and via the normal side of R12AU, and via R2B, HS4A, R17B, and CR1, to side C.

Magnet HS3 closes contacts HS3A, whereby a circuit is closed, as follows:

*EM circuit #1.*—The —40 v. side, through magnet EM, and contacts HS3A, HS4A, R17B, and CR1, to side C.

The contacts R17B, when closed, also allowed the following circuit to form:

*SFM circuit #1.*—The —40 v. side, through magnet SFM, the contacts R4A, thence via contacts R14BU and R13AU to wire w2 or via the normal side of contacts R9B to wire w2, and from there via the contacts R12AU, R2B, HS4A, R17B, and CR1, to side C.

The clutch magnets PFM and SFM having been energized, primary and secondary cycles ensue. During the primary cycle, a card is fed from hopper PH (Fig. 1) to a position just behind the first primary card lever 280. During the secondary cycle, a card is fed from hopper SH to a position just behind the secondary card lever 280.

The eject clutch magnet EM also has been energized, whereby eject rolls 206 and 207 are operated, but no card is present at the eject station at this time. Had a card been present, it would have been ejected to a selected one of the pockets 1 and 2.

During the primary and secondary cycles, cam contacts P5 and S4 (Fig. 3d) close. For the type of operations to be performed here, a pair of plug sockets PD are connected by a plugwire and a pair of plug sockets SD are similarly connected. Accordingly, circuits are established as follows through the coils P of clearing relays D1 and D2:

*P(D1) circuit.*—The —40 v. side, through coil P of relay D1, the plug connection between sockets PD, and via cam contacts P5, to side C.

*P(D2) circuit.*—The —40 v. side, through coil P of relay D2, the plug connection between sockets SD, and via cam contacts S4, to side C.

The hold coils H of relays D1 and D2 are then energized via the AU contacts of the respective relays and the cam contacts CR4.

The relays D1 and D2 are used to clear storage relay settings, in a manner and for reasons explained later.

The relay R50 (Fig. 3b) is in parallel with coil H(R17) and energized at the same time. Contacts R50a (Fig. 3d) close and establish the following circuit:

*Start interlock relays pick-up circuit.*—The —40 v. side, coils P(D3) and P(D4) in parallel, and via contacts R50a, to side C.

Coils H(D3) and H(D4) are energized via contacts D4A and cam contacts CR16. The purpose of these relays D3 and D4 is to prevent initiation of comparing operations, described later, unless the machine is in starting condition.

For the type of operation in which cards in the primary and secondary sides of the machine are to be compared, the feed interlock plug sockets FI (Fig. 3d) are plugged to each other. The circuit of a feed interlock relay FIR is traced below:

*FIR circuit.*—The —40 v. side, relay FIR, thence either via contacts R8AL, or via contacts R14AL and R12BL, to the connected sockets FI, and thence through cam contacts CR8 to the side C.

Cam contacts CR8 (Fig. 3b) open before the primary and secondary cycles end. Accordingly, coil H(R17) is deenergized. The second primary and secondary cycles must be initiated in the same way as the first of such cycles. Briefly, coil P of relay R17 is energized through start key contacts ST1, coil H of R17 is then energized, after which the other circuits, traced before, are established. During the second primary and secondary cycles, the second cards are fed out of the hoppers PH and SH (Fig. 1), while the first primary and secondary cards are fed through the Sequence and Secondary sensing stations, respectively. The first primary card stops just behind the second primary card lever 280, meanwhile having acted on the first primary card lever 280 to close contacts PCL1 (Fig. 3b). The first secondary card stops behind the rear ends of the chute blades 306 and 307, meanwhile having acted on the secondary card lever 280 to close contacts SCL1. Circuits accordingly are established, as follows (Fig. 3b):

*Coil P(R5) circuit.*—The —40 v. side, coil P(R5), and contacts SCL1 and CR5, to side C.

*Coil P(R7) circuit.*—The —40 v. side, coil P(R7) and contacts PCL1 and CR5, to side C.

The coils H of relays R5 and R7 subsequently are energized via the respective contacts R5AU and R7AU, and cam contacts CR15.

During the secondary cycle, cam contacts S2 close and together with contacts R5B (now closed), establish the circuit of parallel coils R8 and R9. Contacts AU of R8 close to hold the circuit after contacts R5B open. Since relay R8 now is energized, it opens contacts R8AL (Fig. 3d) breaking one of the parallel circuit paths through relay FIR.

During the primary cycle, cam contacts P2 (Fig. 3b) close and in conjunction with contacts R7AL establish the circuit of parallel coils R14 and R15. Contacts BL of R15 close to maintain the circuit in effect after contacts R7AL open. Relay R14 opens contacts R14AL (Fig. 3d), whereby the remaining path through relay FIR is opened, and therefore, relay FIR is not energized.

The start key is held down to allow operations to continue. A third primary cycle will occur. But the third secondary cycle will not occur at this time, because relays R8 and R14 remain in energized status at the completion of the preceding cycle. Hence, contacts R8B and R14BU (Fig. 3f) are now in shifted condition, so that the SFM circuit #1, previously traced, is unable to make. No other circuit is made at this time through magnet SFM, whereby a secondary cycle does not occur.

During the third primary cycle, a third card PC is fed from hopper PH (Fig. 1), the second card PC is fed to the second cycle position, and the first card PC is fed through the Primary sensing station, to the eject rolls 206 and 207. On its way, the first card acts on the second primary card lever 280 to close contacts PCL2, establishing the following circuit (Fig. 3b):

*The coil P(R6) circuit.*—The side C, cam contacts CR5, contacts PCL2, and through coil P(R6) to the —40 v. side.

Contacts AU of relay R6 close, whereby the coil H(R6) subsequently is energized upon closure of cam contacts CR15.

Meanwhile, cam contacts P2 close and together with contacts R6A establish the circuit of parallel relay coils R12 and R13. Contacts R13AL close to hold the circuit after contacts R6A open.

It should be noted that during the third primary cycle, the second card has acted, in the same way as the first card did in the preceding cycle, to bring about the energization of relays R7, R14 and R15.

After the third cycle, relay coil H(R17) remains energized, under the assumed conditions, and the start key may be released. The circuit for coil H(R17) will be held through CR6 and R17AU, and during the interval in which CR6 is open (see Fig. 5), the following alternate circuit will be established (see Fig. 3b):

*Coil H(R17) hold circuit.*—The 40 v. side, coil H(R17), contacts R17AL, safety contacts FPC, the normal side of contacts R3AL, the now-shifted side of contacts R9AL, the normal side of contacts R1AL, the now-closed contacts R15BU, the now-shifted contacts R13BL, the normally closed contacts R35B, thence via stop key contacts SK and cam contacts CR7 to line side C.

It will be noted that at this point the relays R12 and R8 both are in energized status; hence the initiating start key circuit cannot be re-established. Should the coil H(R17) hold circuit be broken subsequently, as by temporarily opening the stop key contacts SK, the circuit of coil H(R17) may be re-established by again depressing the start key. A circuit will thereupon be established through coil H(R17) which is the same as the coil H(R17) hold circuit except that it is routed via start key contacts ST2 which shunt contacts R17AL.

Since contacts R9B, R13AU, and R14BU now are in operating status, the SFM circuit #1, previously traced, is unable to make. Whether an alternative circuit will make through magnet SFM depends on plugging and on card comparisons, which will be explained later.

The relay R12 has been energized during the third primary cycle, at a time preceding a closure period of cam contacts CR1 (compare the timing of CR5, P2, and CR1 indicated in Fig. 5). Accordingly, the previous circuit traced through magnets PFM and HS3 cannot make, since contacts R12AU (Fig. 3f) now have been shifted. Whether a new primary cycle shall be performed depends on plugging and card comparisons, all explained later.

Before describing the plugging and the card comparisons, the card sensing circuits and code relays circuits will be explained.

4. Circuits—Code relays and card sensing

The data on the cards will be sensed, stored, and compared. Storage relays are used to store the data. To reduce the number of such relays required per card column, a different data storage code is used than the card data code. This data storage requires the use of only six storage relays for storing data derived from a card column. A plurality of columns of each primary card may be compared with a plurality of columns of a secondary card. For purposes related to such comparison, a group of six primary storage relays and a group of six secondary storage relays are needed for each pair of primary and secondary card columns to be compared. Similar groups of storage relays are used for each pair of such columns to be compared, so that it is sufficient to show only one group of six primary storage relays and one group of six secondary storage relays. Fig. 3a shows the coils P of a group of six primary storage relays and coils P of a group of six secondary storage relays. The relays of the primary group are designated XRP, 0RP, 6P, 3P, 2P, and 1P. Similar designations are used for the secondary group, with terminal letter S being substituted for terminal letter P. The designations indicate the storage code. Thus, relay XRP is picked up as a result of the sensing of either an X or R hole in a card column of a primary card; relay 0RP is picked up as a result of the sensing of a 0 or an R hole in the primary card column; and relay 6P, 3P, 2P, or 1P is picked as a result of the sensing in the primary card column of a 6, 3, 2, or 1 hole, respectively. Further, a combinational pair of the relays 6P, 3P, 2P and 1P is picked up in consequence of the sensing of one of the intrazone perforations 9, 8, 7, 5, or 4 in the primary card column. The addition of the numbers attached to the pair of relays thus picked up equals the number of the intrazone hole 9, 8, 7, 5 or 4 which has been sensed. Thus, relays 6P and 3P store a "9"; relays 6P and 2P store an "8"; relays 6P and 1P store a "7"; relays 3P and 2P store a "5"; and relays 3P and 1P store a "4."

Figure 3C:
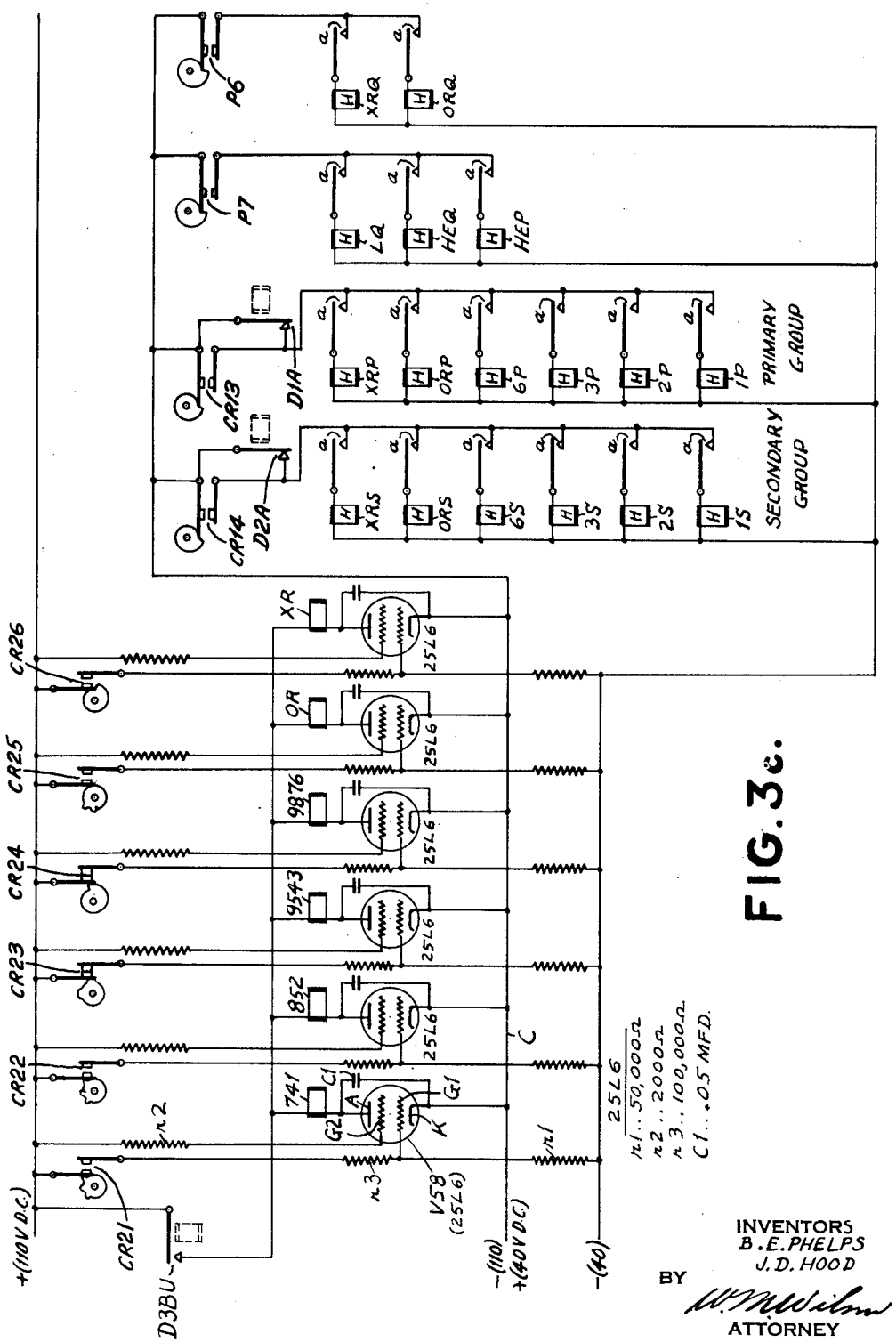

Each group or column of coils P of the storage relays is connected to the anode of an electronic tube of the 25L6 type. In a manner described later, the tube is rendered conductive upon the sensing of any hole in a chosen card column. Unless provision were made to the contrary, all the coils of the group would be energized upon the sensing of any hole. But it is necessary to energize the coils of the group selectively; that is, to energize each storage relay only when a hole is sensed which represents a value to be stored by the storage relay or when a hole is sensed which is part of the combinational representation of a value and which part is to be stored in the storage relay. For example, coil P(1S) or P(1P) is to be energized only when a 7, 4 or 1 hole is sensed, and not when any other hole is sensed, in the associated card column. To provide for selective energization of coils P of the storage relays, they are individually connected to the +110 v. side by relay contacts which are closed only at the desired sensing times at which the coils are to be energized if pertinent perforations are sensed. Thus, coils P(1S) and P(1P) are connected to the +110 v. side by relay contacts 741a and 741b, respectively. These relay contacts are closed only at the 7, 4, and 1 sensing times (see Fig. 5). Similarly, the other coils P of the storage relays are connected to conditioning relay contacts. In short, to provide for selective pick up of the storage relays, in the arrangement shown in Fig. 3a, code conditioning or impulse relays are employed. The code impulse relays are shown in Fig. 3c, where they are designated 741, 852, 9543, 9876, 0R, and XR. These particular reference designations are used in order to denote the sensing times at which they are energized. Thus, relay XR is energized at both the X and R sensing times, relay 741 is energized at the 7, 4, and 1 sensing times, and so on. It may be mentioned that in actual practice, a plurality of code impulse relays and return circuits therefor are arranged in parallel because of the substantial number of relay points to be operated by them. But in order to simplify the drawings, only six different ones of the code impulse relays are shown.

The code impulse or conditioning relays are in the plate circuits of vacuum tubes which are of the 25L6 type. Energization of a relay cannot be effected until the connected tube is rendered conductive, and until relay D3 has been energized to close contacts D3BU. The circuits of relay D3 have been energized to close contacts D3BU. The circuits of relay D3 have been traced before and, it is clear that relay D3 (Fig. 3d) is energized whenever starting conditions have been attained; i. e., when relay R50 (Fig. 3b) along with start relay coil H(R17), is energized.

*The 25L6 tube circuit in general.*—These tubes are used not only in the circuits of the code conditioning relays but in various other circuits. Each such tube operates in the same fashion and the connections of its electrodes to the voltage and control lines are similar. Hence, an explanation of the manner of operation of one such tube, say V58 (Fig. 3c), will suffice for all the tubes.

The anode A of the tube is connected through a work circuit to the + side of the 110 v. line. The screen grid G2 of the tube is kept at constant, required potential by a connection to the +110 v. side through a resistor $r2$. The control grid G1 is connected to the −40 v. side through a resistor $r1$. The operating or pulsing circuit for the control grid starts at the +110 v. side and extends through required switching means and a current limiting resistor $r3$ to the control grid. The cathode K is connected to the common side C of the voltage lines. The cathodes are indirectly heated. Proper filament voltage is supplied in a manner which need not be shown. A condenser C1 is across the cathode and anode. Suitable values of the resistors and the condenser are given in Fig. 3c.

It is seen that with the connections described above, the tube is normally at cut-off; i. e., there is virtually no current flow in the tube, by reason of the control grid being at a potential which is considerably negative with respect to cathode potential. To render the tube conductive, positive potential will be applied to the control grid from the +110 v. side through timed switching means, comprising cam contacts CR21, CR22, CR23, CR24, CR25, and CR26. Such potential will be adequate to reduce the negative bias of the tube to substantially zero. Maximum current will then flow through the tube and energize the work relay in the plate circuit.

*The code conditioning relay circuits.*—During each machine cycle, the cam contacts CR21, CR22, CR23, CR24, CR25, and CR26 (Fig. 3c) close at the sensing times indicated by the designations of the related code conditioning relays (see also the timing chart, Fig. 5). Upon closure of one of these cam contacts, the control grid of a related one of the tubes is brought to substantially zero bias, whereby the tube becomes conductive. For example, cam contacts CR21 close at the 7, 4, and 1 sensing times, so that the tube V58 becomes temporarily conductive at each of these times. When the tube is conductive, the relay 741 is energized by a circuit extending from the +110 v. side, via the now-closed contacts D3BU and through relay 741 and tube V58 to the common side C. Relay 741 closes contacts 741a and 741b (Fig. 3a) to condition coils P(1S) and P(1P) to be energized upon the sensing of 7, 4, or 1 holes in the related card columns of cards at the Secondary and Primary stations, respectively.

The secondary group of six coils P of the storage relays is connected at a common side to the anode of a tube VS. Similarly, the primary group of such coils is connected to the anode of a tube VP. The control grids of tubes VS and VP are coupled via resistors $r3$ to plug sockets SJJ and PRJ, respectively. These sockets are plugged to chosen column sockets SJ and PJ. Assuming that sensing conditions have been attained, the sensing of a hole in the chosen column of a card at the Primary or Secondary station will apply positive potential to the coupled grid of the tube VP or VS, respectively, rendering the tube conductive.

The sensing circuit at the Primary station may be completed during the third primary cycle. As previously described, the first card PC is fed through the Primary station during this cycle, and before the 9 index position, which is the leading position, reaches the sensing brushes PB, the relay R6 (Fig. 3b) is energized. This relay remains energized while the index positions 9 to 0, X, and R are traversing the brushes. Accordingly, if a perforation is sensed in one of these index positions, a sensing circuit is completed as follows (Fig. 3a):

*Primary sensing circuit #1.*—From the +110 v. side, through cam contacts CR19, circuit breakers CB1 or CB2, and CB3 or CB4, thence via wire $w4$, the now-shifted side of relay contacts R6B, the contact roll PC at the Primary station, a brush PB, a plug socket PJ, a plugwire to a socket PRJ, thence via the connected resistors $r3$ and $r1$ to the 40 v. line.

The above circuit applies positive potential to the control grid of tube VP, overcoming its negative bias and rendering it conductive. At the time the perforation is sensed, one or a pair of the code conditioning relays (Fig. 3c) is in energized status, closing contacts (Fig. 3a) for allowing circuits to be completed through one or a pair of the group of coils P of the primary storage relays. For instance, at the time the 9 index position is sensed, code conditioning relays 9543 and 9876 (Fig. 3c) are energized. These close their "b" contacts (Fig. 3a), switching the coils 6P and 3P to the +110 v. side. If there is a perforation in the 9 index position of the chosen column of the card at the Primary station, tube VP is conductive at the time coils 6P and 3P are switched to the +110 v. side. Accordingly, these coils are energized by the following circuit:

*Pick-up circuit of storage relays (6P and 3P).*—From the +110 v. side, thence in parallel via contacts "b" of relays 9876 and 9543 through coils P of relays 6P and 3P, and through tube VP to the common line side C.

During the second secondary cycle, the first card SC is fed through the Secondary sensing station, as previously described, and before the leading, 9 index position reaches the brushes SB, the relay R5 (Fig. 3b) is energized. It remains energized throughout the travel of index positions 9 to 0, X and R past the brushes SB. Contacts R5A (Fig. 3a) close and connect the contact roll at the Secondary station to the CBs. Accordingly, if a hole is sensed in the chosen card column, the tube VS will be rendered conductive. At the same time, one or a pair of the coils P of the group of secondary storage relays will be connected to the +110 v. side by way of one or a pair of the contacts "a" of the code conditioning relays. Thereby, a circuit will be completed through one or a pair of the coils P of the storage relays in the secondary group. For instance, if a hole is sensed in the R position of the chosen column, coils P of relays XRS and 0RS will be energized since contacts XRa and 0Ra are closed at this time.

When the coil P of a storage relay is energized, it closes relay contacts "a" (Fig. 3c), allowing the hold coil H of the relay to be energized. For instance, if coil P of relay 6P is energized, the coil H of this relay is energized by the following circuit:

*Primary storage relay hold coil circuit.*—The −40 v. side, the coil H of relay 6P, the "a" contacts of this relay, and thence in parallel via primary clearing relay points D1A (now closed) and cam contacts CR13, to the common line side C.

The coil H of a storage relay in the secondary group is energized by a similar circuit except that it is completed to the line side C by way of parallel secondary clearing relay contacts D2A and cam contacts CR14.

The energized coils H of the storage relays remain effective until clearing relay contacts D2A and D1A and also cam contacts C13 and C14 break.

*Modification of circuits for storage relays.*— This modification is shown in Fig. 3g. It does not need code impulse or conditioning relays or storage relays with pick up and hold coils.

The modification uses a group of six gas-filled trigger tubes of the 2050 type or equivalent for each group of six storage relays. The storage relays of the primary group are connected to the anodes of the primary group of tubes and to the +110 v. side via parallel clearing relay contacts D1A and cam contacts CR13 (compare the circuits of the hold coils H of the primary group shown in Fig. 3c). The storage relays of the secondary group are connected to the anodes of the secondary group of tubes and to the +110 v. side via parallel contacts D2A and cam contacts CR14. The cathodes of all the tubes connect to the common line side C. The control grids of the primary group of tubes are connected to a common wire $w10$ which leads to the —40 v. side via a resistor $r10$ and to the plug socket PRJ via a suitable current limiting resistor. The control grids of the secondary group of tubes are connected to a common wire $w11$ which connects via a resistor $r11$ to the —40 v. side and via a current limiting resistor to the socket SJJ. Sockets PRJ and SJJ may be plugged to chosen column sockets PJ and SJ (also see Fig. 3a) to receive sensing impulses. The shield grids, called simply shields, of each pair of like-numbered tubes of the two groups are connected via one of the group of six resistors $r$ to the —40 v. side and also via one of the cam contacts CR21 to CR26 to the common line side C.

With the connections as shown, a tube will not fire unless its shield and control grids are simultaneously at increased potential. As long as either the shield or the control grid remains at substantially —40 v. potential with respect to the cathode, the tube will not fire. During a machine cycle, the cam contacts CR21, CR22, CR23, CR24, CR25, and CR26 close at the indicated times, raising the shield potential of the related tubes at these times. Should a sensing potential be applied to the control grid at the same time as the shield is raised in potential, the tube will fire, provided the anode circuit is in closed condition. Assuming this to be the case, the operation of the tubes is as follows:

Cam contacts CR21 close at the 7, 4, and 1 sensing times (also see Fig. 5), increasing the shield potential of tubes T6 and V6 of the primary and secondary group. Should a 7, 4, or 1 hole be sensed in the chosen column at the Primary station, then the control grid of tube T6 of the primary group will be at high potential at the same time that the shield of this tube also is at high potential. Accordingly, tube T6 will fire, causing storage relay 1P to be energized. Likewise, tube V6 of the secondary group will fire and relay 1S be energized if a 7, 4, or 1 hole is sensed in the chosen column at the Secondary station. Neither of the tubes T6 or V6 can fire at any other times because the shield of the tube is then at low, blocking potential. Hence, although sensing potential may be applied to the control grid of a tube T6 or V6 at the 9 sensing time, for instance, as a result of the sensing of a 9 hole in the related card column, the tube will not fire because its shield is still at blocking potential at the 9 sensing time. In a similar manner, the other tubes T1 to T5 and V1 to V5 are conditioned for operation at the times at which their related cam contacts close.

Since the modification does not require code impulse or conditioning relays and contacts, or pick up and hold coils for the storage relays, but depends on the high speed characteristics of the electronic tubes, the machine may operate at a faster speed when the modification is employed. That is, cards may be fed at a greatly increased rate, when the modification (Fig. 3g) is employed than when the main form of circuits (Figs. 3a and 3c) for the storage relays is employed.

Not only may a comparison be made between cards in the primary and secondary runs but also of successive cards in the primary run. The comparison between successive primary cards may be referred to as the sequence or primary run comparison. The sequence comparison requires the use of the Sequence station in addition to the Primary station. For purposes relating to this comparison, gas-filled trigger tubes of the 0A4G type are used in addition to other elements. A set of three tubes of the 0A4G type is required for each pair of card columns of the successive primary cards to be compared. One such set is shown in Fig. 3a, where the tubes are designated V93, V92, and V91. The operation of these tubes will now be described.

*The 0A4G tube operation.*—The cathodes K of the tubes are connected to the common line side C. The anodes A are connected through work relays and cam contacts CR20 to the +110 v. side. The starter anodes $A_1$ are connected through resistor-condenser couplings to the common side C. Each resistor-condenser coupling comprises a pair of resistors $r4$ and $r5$ and a condenser C10 shunting them. Suitable values for these elements are given in Fig. 3a. The junction point 500 of the resistors $r4$ and $r5$ is coupled to a sensing circuit and, when the sensing circuit is closed, approximately 110 volts positive potential is applied to the resistor-condenser coupling. The starter anode is thereby raised in potential sufficiently to trigger the tube. Condenser C10 serves to prolong the effect of the sensing pulse in order to assure sufficient time for triggering the tube. When the tube is rendered conductive, a work circuit may be closed.

The junction point 500 of the resistors related to tube V93 is connected through normally closed relay contacts HEQb to a plug socket PPJ which may be plugged to a chosen socket PJ wired to a sensing brush at the Primary station. The junction point 500 relating to tube V92 is connected to the normally closed side of relay contacts HEPb, of which the normally open side is connected to the junction point 500 relating to tube V91. The common blade of contacts HEPb is connected by wires $w6$ and $w5$ to a plug socket QJJ which may be plugged to a chosen column socket QJ associated with the Sequence station.

Assume that sensing conditions have been established at both the Primary and the Sequence stations. Upon the sensing of a hole in a chosen column of the card at the Primary station, a circuit may be completed as follows:

*Primary sensing circuit #2.*—From the +110 v. side through CR19, the CBs, wire $w4$, the shifted side of R6B, the contact roll PC, the chosen brush PB at the Primary station, a plug socket PJ, a plugwire to a plug socket PPJ, thence via contacts HEQb, and the resistor-condenser coupling associated with the starter anode of tube V93, to the common line side C.

This circuit applies sufficient positive potential to the starter anode of tube V93 to fire the tube. The firing circuit is established only if contacts HEQb are still in closed status. If a perforation has been sensed previously, during the primary cycle, in the comparable card column at the Sequence station, then contacts HEQb will be open and prevent the closure of the above firing circuit.

Assume a perforation in the chosen column is sensed at the Sequence station. As a result, the following circuit may be completed:

*The sequence sensing circuit #1.*—From the +110 v. side, via CR19, the CBs, wire w4, shifted contacts R7B, the contact roll QC, a chosen brush QB at the Sequence station, a plug socket QJ, a plugwire to a socket QJJ, wires w5 and w6 to the common blade of contacts HEPb, thence via the normally closed side of these contacts, and the resistor-condenser coupling associated with the starter anode of tube V92, to the common side C.

The above circuit renders tube V92 conductive. It will be noted that this circuit can be established only if contacts HEPb remain in normal status. This will be the case if the perforation in the card column at the Sequence station is sensed, during the primary cycle, before a perforation in the comparable column at the Primary station. If contacts HEPb have shifted before the above circuit makes, then the sensing pulse coming from the Sequence station will be led to the junction point 500 relating to the tube V91, whereby this tube will be rendered conductive instead of tube V92.

The tubes V91, V92, and V93 will fire only if their anode circuits are closed. The anode circuits are closed only during the 9 to 1 sensing times of a cycle. This is because cam contacts CR20 open just before the CBs effectively close for the 0 sensing time (see Fig. 5). Thus, these tubes cannot become conductive and their work circuits cannot be established after the 1 sensing time. It is also understood by now that the perforations 9 to 1, 0, X and R pass in the stated order through the sensing station. Thus, if a higher value numeric or intrazone perforation is sensed in the card at the Primary station then in the card at the Sequence station, the tube V93 will be rendered conductive first, and a work circuit will be completed as follows (Fig. 3a):

*The coil P(HEP) circuit.*—The +110 v. side, CR20, coil P(HEP), and through tube V93, to the common side C.

Contacts "a" of the relay HEP (see Fig. 3c) will close and the hold coil H of the relay will be energized subsequently by a circuit extending from the —40 v. side through coil H(HEP), contacts "a" of the relay, and cam contacts P7 to the common side C. Contacts P7 maintain the circuit closed into the next primary cycle (see Fig. 5).

When relay HEP is energized, it shifts contacts HEPb (Fig. 3a), so that upon the sensing of an intrazone perforation subsequently in the comparable column at the Sequence station, the tube V91 will be rendered conductive, and a work circuit will be completed through the coil P(LQ).

If the intrazone perforation in the chosen column at the Sequence station has a higher value than the perforation in the comparable column at the Primary station, the contacts HEPb will be in normal status at the time the perforation is sensed at the Sequence station. Hence, the tube V92 will be rendered conductive, and the work relay HEQ will be energized. Contacts HEQb will open, preventing the feeding of a subsequent sensing impulse, coming from the Primary station, to the starter anode of tube V93. Accordingly, this tube will remain non-conductive and relay HEP will not be energized.

If the intrazone perforations sensed at the Primary and Sequence stations are of equal value, then both tubes V93 and V92 will be rendered conductive simultaneously, and both relays HEP and HEQ will be energized.

While the tubes V93, V92, and V91 and the related circuits described above are sufficient for comparing numerical values, additional means must be provided to take care of alphabetic values and of the special dash symbol represented by an R perforation. The additional means includes a 25L6 tube designated V39 (Fig. 3a). The anode of this tube is connected to the common side of a pair of coils P of relays XRQ and 0RQ. The coil P(XRQ) is connected at the X and R sensing times, by means of code impulse relay contacts XRc, to the +110 v. side. Coil P(0RQ) is connected at the 0 and R sensing times by code impulse relay contacts 0Rc to the +110 v. side. When a perforation is sensed in the chosen card column at the Sequence station, a sensing impulse is applied to the control grid of tube V39. The circuit for applying this impulse extends from the +110 v. side through the path traced in the sequence sensing circuit #1 as far as wire w5. From wire w5, the circuit continues through a resistor r3 to the control grid of tube V39. This impulse renders tube V39 momentarily conductive. If the perforation is an X perforation, then the relay coil P(XRQ) will be energized by a circuit extending through thenclosed contacts XRc and conductive tube V39. If the perforation is a 0 perforation, then coil P(0Rc) is energized by way of contacts 0Rc and tube V39. If an R perforation is sensed, then both coils P(0RQ) and P(XRQ) are energized. Contacts "a" of relays XRQ and 0RQ (see Fig. 3c) close when coils P of these relays are energized. Coils H of the relays are energized via the "a" relay contacts and cam contacts P6.

To recapitulate, with respect to sequence of cards in the primary run, relay HEP (Fig. 3a) is energized if the intrazone value at the Primary station is higher than or equal to the comparative value at the Sequence station; relay HEQ is energized if the intrazone value at the Sequence station is higher or equal; and relay LQ is energized if the intrazone value at the Sequence station is lower. Further, relays XRQ and 0RQ (Fig. 3a) are energized selectively if the related card column at the Sequence station has a 0 or X perforation and both are energized if an R perforation is sensed. These various relays plus the XRP and 0RP relays, which are energized according to whether the chosen column at the Primary station has a 0, X, or R perforation, enter into the selection of comparison relays indicative of the relationship in magnitude of data sensed at the two stations in the primary side. In addition, the selection of the comparison relays depends on so-called blank and zero correction relays which will be explained later.

With respect to the sensing at the Primary and Secondary stations, the relays XRP, 0RP, 6P, 3P, 2P, and 1P (Fig. 3a) of the primary group and the corresponding relays of the secondary group are selectively energized according to the zone and intrazone perforations sensed in compared fields of cards at the Primary and Secondary stations. These relays plus blank and zero correction relays control the selection of relays indicative of the value relationship of data sensed in cards of the primary and secondary runs.

The circuit network for selecting relays indicative of the relationship of compared values in cards of the primary run is shown in Fig. 3d. The circuit network relating to the compared values in cards of both runs; primary and secondary, is shown in Fig. 3e. Before explaining these networks, the blank and zero correction relays will be explained.

5. Blank and zero correction means

The purpose of the blank and zero correction means is to supplement the other relays, previously mentioned as controlled by the sensing of designations at the three stations, in determining the relationship of the compared values in accordance with the prescribed value scale given in Section 1. To repeat, in this scale, the values, in ascending relation, are: blank, dash (R hole), A, B, C . . . X, Y, Z, 0, 1 . . . 8, 9.

The storage relays HEP, LQ, HEQ, XRQ, ORQ, XRP, ORP, 6P, 3P, 2P, IP, XRS, ORS, 6S, 3S, 2S, and IS (Figs. 3a and 3c) take care of the required scale of magnitude under all but two special conditions: (A), blank in one compared column and 0 or the dash symbol (R hole) or any alphabetic character in the compared column; (B) whose designation includes a 0 hole in the compared column. To take care of these two conditions, the blank and zero relays are used to supplement the other relays. It is understood that there is a set of the storage relays and of the blank and zero correction relays for each denominational order of card data to be compared.

The circuits for the highest order of blank and zero correction relays are shown in Fig. 3e. The circuits for all the orders of such relays are routed via cam contacts CR17, which close after the last index position sensing time in a cycle; namely, after the R sensing time, and also are routed via start interlock relay contacts D3BL which are in closed status if starting conditions have been attained.

There are four blank and zero correction relays for each compared order. These are designated QBZ, PQZ, PBR, and SBR. The conditions under which these relays may be energized after a sensing period are given below.

1. If the chosen column of the card sensed at the Sequence station is blank, then relay QBZ is energized by the following circuit (Fig. 3e):

*The QBZ circuit #1.*—From the —40 v. side through QBZ, and contacts ORQb, XRQb, HEQb, LQb, D3BL, and CR17 to the common line side C.

2. If the column sensed at the Sequence station has any designation including an R or 0 perforation, and the corresponding column at the Primary station has only a 0 perforation, then relays ORQ and ORP, (Figs. 3a and 3c) along with possibly the relay XRQ and/or relay HEQ, are in energized status, whereby the following circuit may make through relay QBZ:

*The QBZ circuit #2.*—From the —40 v. side, through QBZ, now-closed contacts ORQc, the shifted contacts ORPb, and then via XRPb, 6Pb, 3Pb, 2Pb, IPb, D3BL and CR17, to side C.

3. If the column at the Sequence station has only a 0 perforation and the corresponding column at the Primary station has any designation including an R or 0 perforation, then the relays ORQ and ORP, along with possibly one of the other primary storage relays, are in energized status, so that the following circuit is able to make through a relay PQZ:

*The PQZ circuit #1.*—The —40 v. side through PQZ, contacts "d" (now-closed) of relay ORP, the now-shifted contacts ORQb, and via XRQb, HEQb, LQb, D3BL, and CR17, to side C.

It should be noted that if both the sequence and primary columns contain merely the zero designations, then both the QBZ circuit #2 and the PQZ circuit #1 make, whereby both relays QBZ and PBZ are energized.

4. If the column at the Primary station is blank, then the following circuit may make through the relay PQZ:

*PQZ circuit #2.* — From the —40 v. side, through PQZ, contacts "c" of relay ORP, thence via contacts "b" of this relay and via XRPb, 6Pb, 3Pb, 2Pb, IPb, D3BL, and CR17, to side C.

A circuit also makes, when the column at the Primary station is blank, through a relay PBR, as follows:

*PBR circuit #1.*—The —40 v. side through PBR, directly to contacts "b" of relay ORPb and thence as in the preceding circuit to side C.

5. If the column at the Primary station has any designation including an R or 0 perforation and the corresponding column at the Secondary station has only a 0 perforation, then relays ORP and ORS, along with possibly one of the other primary storage relays, are in energized status, whereby a circuit may make through relay PBR as follows:

*PBR circuit #2.*—The —40 v. side, through PBR, the shifted contacts "c" of relay ORP, the shifted contacts "b" of relay ORS, and thence via XRSb, 6Sb, 3Sb, 2Sb, ISb, D3BL, and CR17 to side C.

6. If the column at the Secondary station is blank, a relay SBR may be energized as follows:

*SBR circuit #1.*—The —40 v. side, through SBR, ORSb, XRSb, 6Sb, 3Sb, 2Sb, ISb, D3BL, and CR17 to side C.

7. If the column at the Secondary station has any designation including a 0 or R perforation and the corresponding column at the Primary station has only a 0 perforation, then relays ORP and ORS, along with possibly one of the other secondary storage relays, are in energized status, so that relay SBR may be energized as follows:

*SBR Circuit #2.* — The —40 cv. side, through SBR, contacts ORSc, ORPb, XRPb, 6Pb, 3Pb, 2Pb, IPb, D3BL, and CR17, to the side C.

If the primary and secondary columns both contain only zeros, then the PBR circuit #2 and the SRB circuit #2 both make, whereby relays PBR and SBR both are energized.

It should be noted that the chosen column sockets PJ (Fig. 3a) at the Primary station should be plugged to like-numbered sockets PRJ and PPJ, and that corresponding column sockets QJ at the Sequence station should be plugged to the same numbered sockets QJJ as the plugged-in sockets PRJ and PPJ in order that the correlated orders of storage relays and blank and zero correction relays required for sequence control should be energized. The columns to be sensed at the Primary station for sequence control are not necessarily the ones to be compared with the chosen columns at the Secondary station, but to simplify the drawings, the same primary columns are shown plugged up for sequence control as for dual run control. For the sake of simplicity, only the control and comparing means related to one order are shown. Referring to Fig. 3a, column 8 brush socket SJ is plugged to the socket SJJ-1; column 12 brush socket PJ is plugged not only to socket PRJ-1 but also to socket PPJ-1; and column 12 brush socket QJ is plugged to socket QJJ-1. This indicates that a field of columns of cards in the primary run whose highest order column is number 12 is to be used for sequence control and that a field of columns of cards in the primary run, also beginning with column 12, is to be compared with a corresponding field of columns of cards in the secondary run, beginning with column 8, for dual run selection control.

It will be noted that each of the blank and zero correction relays QBR, PQZ, PBR, and SBR (Fig. 3e) is energized by either of two circuits.

Relay QBZ is energized under conditions 1 or 2; i. e., if the column sensed at the Sequence station is blank, or if it bears any designation including the 0 or R perforation while the column sensed at the Primary station contained only a 0 perforation.

Relay PQZ is energized under conditions 3 and 4; i. e., if the column sensed at the Sequence station has only a 0 designation while the column sensed at the Primary station has any designation including the 0 or R perforation, or if the column sensed at the Primary station is blank.

Relay PBR is energized under conditions 4 and 5; i. e., if the column sensed at the Primary station was blank, or if it had any designation including a 0 or R perforation while the column sensed at the Secondary station had only a 0 perforation.

Relay SBR is energized under conditions 6 and 7; i. e., if the column sensed at the Secondary station is blank, or if it has any designation including a 0 or R perforation while the column sensed at the Primary station has only a 0 perforation.

It will be noted that, with respect to sequence control; i. e., control by successive cards in the primary run, the complementary conditions are 1 and 4, and 2 and 3, and cover all possible blank and zero conditions in the control card columns passed through the Sequence and Primary stations during a cycle. Relays QBZ and PQZ relate only to the sequence control and their contacts are to be found only in the primary run selection circuits (see Fig. 3d).

With regard to dual run control; i. e., control by cards run through the Primary and Secondary stations, conditions 4 and 6, and 5 and 7, are complementary, and cover all possible blank and zero conditions in chosen control columns of these cards. Relay PBR and SBR relate only to the dual run control and their contacts are to be found only in the dual run selection circuits (Fig. 3e).

The primary run selection circuits will be explained now.

6. *The primary run selection circuits (Fig. 3d)*

These circuits operate selectively according to the relative magnitude of values in chosen sequence control card fields sensed at the Sequence and Primary stations during a cycle. It may be well to repeat here the prescribed scale of magnitude. This scale, in ascending order, is: blank, dash (R hole), A to Z, and 0 to 9. Each order of the selection circuits has three comparative value paths along which applied potential may be transmitted. There is an intermediate path which corresponds to an equal magnitude condition in the order, an upper path which corresponds to a superiority in magnitude of the value sensed at the Sequence station, and there is a lower path which corresponds to an inferiority in magnitude of the value sensed at the Sequence station. The potential is applied to an incoming portion of the intermediate or equality path. It is then directed by relay contacts selectively to the superior or upper path, the equality path, or the inferiority or lower path depending on the relation of the values in the order. Each order is alike. Obviously, the value relation in a higher order dominates the value relation in the lower order. Hence, potential will be applied to the highest order of these circuits. The highest order, if the values therein are equal, will transmit the potential to the incoming equality line of the next lower order, and so on to the lowest order. But if any order receiving potential on the equality line manifests superiority of the value sensed at the Sequence station, the potential will be directed to the upper line U of this order and thence directly to an electronic tube. If the reverse value relation is true, then the potential will be directed to a lower line L and thence transmitted directly to an electronic tube. It follows that the upper lines U of all the orders are connected and in fact are portions of a single upper line and that the lower lines L of all the orders are similarly connected. Briefly, then, if in any higher order, a value sensed at the Sequence station is higher, the relation of values in the lower orders does not matter since the control data as a whole are then higher at the Sequence station. Similarly if the sequence value is inferior in a higher order the relation of values in the lower orders does not matter. When the values in all the orders are equal, the potential is transmitted through all the denominationally ordered circuits to an electronic tube. The provision of the electronic tubes in the outputs of the comparing circuits enables a greater number of denominationally ordered circuits to be used in the comparing network. In the present case, as many as nineteen such denominationally ordered circuits may be arranged in tandem. The cumulative resistance of all the denominationally ordered circuits is small compared to the value of grid resistance $r1$ (see Fig. 3c). Hence, the drop in potential across all or any number of the denominationally ordered circuits is small compared to the resistance of $r1$, whereby the potential applied to the grid of a tube will not vary materially with the number of circuits through which the potential is transmitted and, therefore, the tube will have a rapid, sensitive and substantially constant response to the output potential of the comparing circuits. If relay windings were to be used in place of the tubes, their resistance, individually, would be in far smaller proportion to the cumulative resistance of the denominationally ordered comparing circuits than the proportion of resistance $R1$ to the cumulative resistance of the circuits. Hence, variations in the number of circuits through which potential would be transmitted to the relay windings would have a substantial effect on the operation of the relays. This would limit the number of denominations to be compared and also would limit the speed of operation of the machine. The provision of the electronic tubes in the comparing network of the present case thus permits the number of denominations to be compared and the speed of the machine to be increased.

Fig. 3d shows the highest order of primary run selection circuits in detail. All the other orders are of the same nature and construction.

After sensing has been completed in a cycle and after the blank and zero correction relays have been given time to operate, cam contacts CR18 close (see also Fig. 5). These contacts connect the +110 v. side to a group of sockets COJ (see also Fig. 3e). One of these sockets appears in Fig. 3d. When sequence control is desired, this socket is plugged to a socket PQJ which is connected by start interlock relay contacts D4BL to the incoming line E for the highest order of selection circuits. The description below refers, except when otherwise noted, to this highest order. For convenience, the value or designation or column, when sensed at the Sequence station will be referred to as the Sequence value or designation or column and when sensed at the Primary station will be referred to as the primary value or designation or column.

The incoming potential, on wire E, is directed first to relay contacts PQZa.

As explained in Section 5, the relay PQZ (Fig. 3e) is energized if the Primary station column is blank (condition 4), or if it has a designation which includes a 0 or R hole while the Sequence station column has a 0 hole alone (condition 3). Should either of these conditions exist, then the Primary station value is no higher than the Sequence station value, but it may be equal. The potential transmitted to contacts PQZa is passed thereby to contacts of relay QBZ.

Relay QBZ (Fig. 3e) is energized if the Sequence station column is blank (condition 1), or if it has a 0 or R hole while the Primary station column has a 0 hole alone (condition 2). Thus, relay QBZ may be energized only if the Sequence station value is no higher than the Primary station value, but it may be equal.

Conditions 1 and 4 may be coexistent (both compared column blank). Conditions 2 and 3 may be coexistent (both compared columns containing only the 0 holes). But conditions 1 and 2, 1 and 3, and 2 and 4 are mutually exclusive.

*Example 1.*—Assume, for instance, that conditions 1 and 4 exist. This indicates blank compared columns, an equal relation. Relays PQZ and QBZ are in energized status. The potential on line E (Fig. 3d) is transmitted by shifted contacts PQZa and QBZa to the intermediate, equality path. Since both compared columns are blank, the XRP, XRQ, ORP, ORQ, HEQ and HEP relays (see Figs. 3a and 3c) are in unenergized status. Accordingly, the potential is transmitted from the shifted contacts QBZa to the normal side of contacts XRPc, thence via the normal sides of contacts XRQc, ORPe, ORQd, HEQc, and HEPd to the equality, outgoing line El which leads to the contacts of the next lower order (not shown). The further path of the potential will depend on the relation of the values in the lower orders.

*Example 2.*—Assume that conditions 2 and 3 exist; that is, that there are 0 perforations only in the compared columns, also an equal relation. The same result is obtained as in Example 1, but the path of potential is different. In this case, relays PQZ and QBZ and relays ORP and ORQ are all in energized status. The potential on wire E therefore is fed by the shifted contacts PQZa and QBZa, the normal contacts XRPc and XRQc, the shifted contacts ORPe and ORQd, and the normal contacts HEQc and HEPd, to outgoing equality line El. It is seen that if the corresponding primary and sequence relays; for example, ORP and ORQ, are in the same status, whether energized or deenergized, their contacts lead the applied potential to a portion of the equality path.

*Example 3.*—Assume that condition 1 exists (blank Sequence column) and that the other conditions 2, 3, and 4 are absent. Accordingly, the sequence value as a whole is lower than the primary value, since the highest order Sequence column is blank and the comparative column is not blank. Relay PQZ remains unenergized. Relay QBZ is in energized status. The potential on wire E is transmitted by the normal side of contacts PQZa to the shifted contacts QBZb which direct the potential to the lower line L. The potential on this line is transmitted directly to the control grid of a 25L6 tube V80. This tube thereupon is rendered conductive, allowing the coil P of the sequence control comparison relay QL to be energized.

*Example 4.*—Assume that condition 2 exists alone; that is, that the sequence column bears an alphabetic designation of which the 0 or R hole is a part or bears the dash designation (R hole alone) while the primary value is zero. Since the highest order is being considered and since, in the prescribed scale of values, an alphabetic character or the dash symbol is lower than the zero character, the potential on wire E should be directed to the lower line L and thence to tube V80, whereby coil P(QL) will be energized. When condition 2 exists alone, relay PQZ is not energized but relay QBZ is energized. This is the same as in Example 3.

*Example 5.*—Assume that condition 3 exists alone; that is, that the sequence value is zero, while the primary value bears an alphabetic designation including the 0 or R hole or bears the dash symbol designation, the R hole. Therefore, the sequence value as a whole is higher than the primary value, since the highest compared orders are being considered. The relay PQZ is energized, while the relay QBZ is not energized. Hence, the potential on wire E is fed via the shifted contacts PQZa and the normal side of contacts QBZa to the upper line U. The potential is transmitted by this line to the control grid of a tube V78, rendering it conductive, whereby coil P of the relay QH is energized.

*Example 6.*—Assume that condition 4 alone exists; that is, the primary column is blank while the sequence column is not blank. Therefore, the sequence value is higher. Under this condition, relay PQZ is energized, but relay QBZ is not energized. This is the same as Example 5.

If none of the conditions 1, 2, 3 and 4 exist, then neither of the compared columns is blank. Further, neither of these columns bears the zero value at the same time that the comparative value has a designation including the 0 or R hole. The value relationship then depends on the other items which may be designated in the compared columns. This situation will now be discussed in various aspects. In this situation, neither relay PQZ nor QBZ is energized. The potential on wire E therefore is transmitted by the normal sides of contacts PQZa and QBZb to the blade of contacts XRPc. If the primary designation includes an X or R hole, while the sequence designation does not, then relay XRP (Figs. 3a and 3c) is energized while relay XRQ is not energized. Consequently, the potential is transmitted by shifted contacts XRPc and normal contacts XRQb to line U, indicating that the sequence station value is higher. This is correct since the dash and the alphabetic characters whose designation includes the R or X hole are lower in the scale of values than alphabetic characters whose designation includes the 0 hole and lower than the numbers 0 to 9. If the primary designation does not include an X or R hole but the sequence designation does, then the relay XRP is not energized, while the XRQ relay is in energized status. Accordingly, the potential is transmitted via the normal side of contacts XRPc and the shifted side of contacts XRQc to the lower line L. If neither of the compared columns has an X or R hole, or if both have an R or X hole, the compared values appear equal in this respect and the value relation will depend further on the succeeding contacts of the order of selection circuits. Thus, if neither relay XRP nor XRQ is energized, the potential is transmitted via the normal sides of contacts XRPc and XRQc to the portion of the equality line leading to the blade of contacts ORPe. If both relays XRP and XRQ are energized, the potential travels to contacts ORPe via the shifted contacts XRPc and XRQb.

Assume that there is a 0 hole in the primary designation but not in the sequence designation. This indicates, when the potential has been transmitted as far as contacts ORPe, that either the zero or an alphabetic designation is in the primary column and one of the numbers 1 to 9 is in the sequence column. Hence, the sequence value is higher in the given scale. Under this assumed condition, relay ORP is energized while relay ORQ is not energized. Accordingly, the potential is transmitted via shifted contacts ORPe and normal contacts ORQc to upper line U. On the other hand, if there is a 0 hole in the sequence designation but not in the primary designation, the former designation is lower in the scale. Relay ORP is not energized, but relay ORQ is energized. The path of potential is then through the normal contacts ORPe and the shifted contacts ORQd to lower line L. If both compared values have R designations, the relays XRP, XRQ, ORP and ORQ are all energized. The potential is then transmitted via the shifted contacts XRPc, XRQb, ORPe and ORQc to the blade of contacts HEQc. If both columns lack the R designation but have X designations, it follows that neither column has a 0 or R designation. Hence, relays XRP and XRQ are in energized status while relays ORP and ORQ are in unenergized status. The path of potential is then through the shifted contacts XRPc and XRQb and the normal contacts ORPe and ORQd to the blade of contacts HEQc. If both columns have 0 perforations (as parts of alphabetic character designations), then relays XRP and XRQ are not in energized status while relays ORP and ORQ are in energized status. The path of potential is then through normal contacts XRPc and XRQc and shifted contacts ORPe and ORQc to the blade of contacts HEQc.

When the potential has been transmitted as far as contacts HEQc, then the compared columns both have either R designations, or X designations, or 0 designations or none of these designations. The value relation then will depend on the intrazone characteristics 9 to 1. As described hereinbefore, if the sequence designation includes an intrazone value higher than or equal to the intrazone value in the primary designation, then relay HEQ (Figs. 3a and 3c) is in energized status. If the Primary station intrazone value is higher than or equal to the Sequence station intrazone value, then relay HEP is in energized status. Assume relay HEQ is energized. Potential transmitted to the blade of contacts HEQc will then be fed further via these shifted contacts to the contacts HEPc. If the sequence intrazone value is higher, then relay HEP will not be energized. Hence, the contacts HEPc will transmit the potential to upper line U. If the Sequence station intrazone value is lower, then relay HEQ will not be energized, while relay HEP will be energized. The path of potential then will be via the normal contacts HEQc and shifted contacts HEPd to lower line L. If both intrazone values are equal, both relays HEP and HEQ are energized. The path of potential is then through the shifted contacts HEQc and HEPc to the outgoing equality line EI. From there, the path of potential depends on the value relations in the lower orders of the selection circuits.

Assuming that the compared values sensed at the sequence and primary relays are equal in all orders, potential will be present on the lowest order outgoing wire EI9. This wire is connected through plug connection PRC (made when sequence control is desired) to the control grid of a tube V79. Hence, with potential present on wire EI9, tube V79 will be rendered conductive, whereby coil P(QE) will be energized.

It may be noted that in the absence of the blank and zero correction relays, the proper relation of magnitude within the prescribed scale of values would not be obtained by the selection circuits. Thus, presuming the absence of correction relays PQZ and QBZ, if the sequence column were blank and the primary column contained the X or R hole, the shifted points XRPc and the normal side of contacts XRQb would feed the potential to line U, which is incorrect. If the primary column contained the 0 hole and the sequence column were blank, then the shifted points ORPe and the normal side of contacts ORQc would lead the potential to line U, also incorrect. Likewise, if the primary column were blank and the secondary column had an R, X, or 0 perforation, the potential would be fed to the line L, which is incorrect. In the case of a zero in the sequence column and, for example, the designation for letter Y (0 and 8 holes, as given in Fig. 4) in the primary column, the potential would be fed via the shifted points ORPe and ORQc, the normal points HEQc, and the shifted points HEPd to line L, which is incorrect. If the 0 and 8 holes were in the Sequence station column and the zero in the Primary station column, the path of potential would be via shifted ORPe, ORQc, and HEQc and normal HEPc to line U, which also is incorrect. The need for the blank and zero correction relays has thus been made evident.

Whichever of the coils P of relays QH, QE, and QL is energized, closes the related "d" contacts of the relay (see Fig. 3d), whereby the hold coil H of the relay is energized by a circuit as follows:

*Coil H of relay QH, QE, or QL circuit.*—The —40 v. side, the "d" contacts of the relay, the coil H of the relay, and cam contacts P2, to the common line side C.

Cam contacts P2 remain closed until a subsequent primary cycle (see Fig. 5) is performed and then open in the early portion of the primary cycle. The energized coil H of the relay QH, QE, or QL remains effective until then.

The dual run selection circuits which are controlled according to the relation of values designated in the chosen columns of cards sensed at the Primary and Secondary stations will now be described.

7. *The dual run selection circuits (Fig. 3e)*

After the sensing period has ended and sufficient time has been taken to energize the blank and zero correction relays, cam contacts CR18 close and connect the sockets C0J to the +110 v. side. One of these sockets is plugged to socket DJ if a dual run comparison is to be made. Socket DJ is connected via start interlock relay contacts D4BU to the wire E "in" which transmits the +110 v. potential to the highest order of the dual run selection circuits. The same general considerations apply to these circuits as to the primary run selection circuits. Briefly, the relation of values in a higher order dominates the relation in a lower order. If the compared values in an order are equal, the potential will be transmitted by the order of selection circuits to a wire leading, in the manner of wire E "in," into the next lower order of circuits. If the primary value is lower than the secondary value, the potential will be diverted to the upper line P "lo," which is coupled to the control grid of a tube V81 of the 25L6 type. This tube is rendered conductive thereby, and the work relay PL is energized. If the secondary value is lower, the potential applied to the order of selection circuits will be diverted to the lower line S "lo" which is coupled to the control grid of a tube V83 of the 25L6 type. This tube is rendered conductive and the work relay SL is energized. If the values in all orders are equal, the path of potential is through all the orders to the outgoing equality line E "out" which is connected via the normal side of contacts "a" of relay FIR to the control grid of a tube V82 of the 25L6 type. The tube is rendered conductive and work relay PES is energized. As explained in Section 3, relay FIR is deenergized during the second primary and secondary cycles. Hence, under normal dual run conditions, the line E "out" is connected to the control grid of tube V82. The reasons for interposing contacts of relay FIR in outgoing dual run selection lines will be explained later, in Section 8.

Each order of dual run selection circuits is alike, and it is sufficient to show only the highest order in detail. It will be noted that in the dual run selection network of an order, contacts of storage relays 6P, 3P, 2P, and IP and 6S, 3S, 2S, and IS are provided. These relays store individual intrazone values in contrast to relays such as HEQ and HEP which operate according to the relation of intrazone values as a whole. The storage relays are needed for the dual run comparison because it is required, under certain conditions, to detain the card in either the primary or secondary side, to feed the compared card in the other side to the eject station, and effect a new comparison between values derived from the detained card and values on a new card in the other run. For example, the card in the primary run may be detained while the card in the secondary run may be ejected and a following card in the secondary run fed through the Secondary sensing station. A comparison of values on the detained primary card with the values designated on the new card passing through the Secondary station must be made. Since the detained card cannot be sensed over again during the same run of operations, it is necessary to provide storage relays which store the values previously sensed in the detained card. These values stay in storage and are not cleared out until the detained card is ejected and a following card in the same run is fed past the Sensing station. On the other hand, in the sequence control, it is desired merely to compare each primary card with the preceding primary card, for which it is sufficient to provide intrazone relative value relays such as HEP and HEQ.

The blank and zero correction relays PBR and SBR serve the same purposes in the dual run selection circuits as the relays PQZ and QBZ in the primary run selection circuits.

As explained in Section 5, the relay PBR is energized if the Primary station column is blank (condition 4), or if it has a designation which includes an R or 0 hole and the Secondary station column has a zero designation (condition 5).

The relay SBR is energized if the Secondary station column is blank (condition 6), or if it has a designation including an R or 0 hole while the Primary station column has a zero designation (condition 7).

Several examples of comparison of values will be given below:

*Example 1.*—Assume the chosen primary card column is blank, while the secondary card column has any perforation. Relay PBR will be in energized status but not relay SBR. Accordingly, the potential on wire E "in" will be fed via shifted contacts PBR*a* and normal contacts SBR*a* to line P "low" and thence to tube V81, resulting in energization of relay PL.

*Example 2.*—Assume the primary card column has a designation, other than zero, including an R or 0 hole while the secondary card column has a zero designation. Accordingly, relay PBR is energized, but not the relay SBR. The result is the same as in Example 1.

*Example 3.*—Assume the secondary card column is blank but the primary card column is not blank. Consequently, relay SBR is energized, but not relay PBR. Hence, the path of potential will be via the normal contacts PBR*a* and shifted contacts SBR*b* to the line S "lo." Tube V83 will be rendered conductive and relay SL will be energized.

*Example 4.*—Assume the secondary card column bears any value, other than zero, but including an R or 0 hole, while the primary card column contains number 0. The relay SBR is energized, but not the relay PBR. The result is the same as in Example 3.

*Example 5.*—Assume the primary card column and the secondary card column both contain zeros. Hence, both relays PBR and SBR will be energized. Under this assumption, relays ORP and ORS also are in energized status but none of the other storage relays is energized. The path of potential will be through the shifted contacts PBR*a* and SBR*a*, the normal contacts XRP*b* and XRS*c*, the shifted contacts ORP*d* and ORS*c*, to the contacts 6S*b*. Since, for this example, contacts 6S*b* and the remaining contacts are in normal status, the potential will be transmitted to the outgoing equality line, leading to the next lower order. The further path of potential will depend on the value relation in the lower orders.

*Example 6.*—Assume the primary card column bears the designation, R–9, for the letter I (see Fig. 4), while the secondary column bears the designation, R–8, for the lower value letter H. Hence, primary storage relays XRP, ORP, 6P and 2P and secondary storage relays XRS, ORS, 6S, and 2S are in energized status. The path of comparing potential will be via the normal contacts PBR*a* and SBR*b*, the shifted contacts XRP*b*, XRS*b*, ORP*d*, ORS*c*, 6S*b*, and 6P*b*, and thence via the normal side of 3S*b* and the shifted side of 3P*c* to the line S "lo."

*Example 7.*—Assume the primary card column bears the designation R-9 for letter I while the secondary card column bears the designation X-9 for higher value letter R. Hence, primary relays XRP, ORP, 6P, and 3P and secondary relays XRS, 6S, and 3S are in energized status. The path of comparing potential is then via the normal contacts PBRa and SBRb, shifted contacts XRPb and XRSb, shifted contacts ORPd and normal contacts ORSc to the line P "lo."

*Example 8.*—Assume the primary card column bears the number 9 designation while the secondary card column bears the number 3 designation. Hence, primary relays 6P and 3P and secondary relay 3S are in energized status. The path of potential will be via the normal sides of contacts PBRa, SBRb, XRPb, XRSc, ORPd, and ORSd; thence via the normal side of contacts 6Sb and the shifted contacts 6Pc, to the line S "lo."

Enough examples have been given to illustrate the manner of operation of the dual run selection circuits.

In the absence of the blank and zero correction relays, the comparison would not be in accordance with the prescribed scale of values. Presuming the absence of relays PBR and SBR, suppose the primary card column is blank while the secondary card column bears the R hole alone, representing a dash. Hence, relays XRS and ORS would be in energized status. The potential would be led via the normal side of XRPb and the shifted side of XRS to line S "lo," which is incorrect. Suppose the primary card column had a zero designation while the secondary column had an alphabetic item, say letter W, represented by the 0 and 6 holes. Hence, relays ORP and ORS and 6S would be in energized status. The path of comparing potential would be via the normal sides of XRPb and XRSc, the shifted sides of ORPd and ORSc, the shifted side of 6Sb, and the normal side of 6Pb to line P "lo," which is incorrect. Enough examples have been given to show that the blank and zero correction means are necessary to provide for a correct dual run comparison of the values in accordance with the prescribed scale of magnitude.

8. *Operation and remaining circuits*

The machine is capable of a diversity of operations. For purposes of this disclosure, one particular mode of operation, which may be called "Merging," will be described. A card in one run is said to match with a card in the other run, when their control values are equal. In the merging operation to be described, unmatched primary cards will be directed to pocket 1 (Fig. 1), matched primary cards will be directed to pocket 2, matched secondary cards to pocket 2, behind or above the matching primary card or cards, and unmatched secondary cards to pocket 4. Moreover, should the cards in the primary run be out of sequence, operation of the machine will be interrupted.

There are various sequences of primary cards which may be sought. Ordinarily, the desired sequence is one in which successively fed primary cards should have equal or higher sequence or group control values than the preceding primary cards. This is the sequence chosen by the plugging shown in Fig. 3f. As shown, a socket QLJ is plugged to a socket EJ which is wired via contacts AL of a relay R34 to the pick up coil P of a so-called error relay HS4. As described in Section 6, if the card sensed at the Sequence station is found to have a lower sequence control value than the preceding card, sensed at the Primary station, relay QL (Fig. 3d) is energized. Contacts "3" of relay QL (see Fig. 3f) close, and upon closure of cam contacts CR1 before the end of the primary cycle in which the comparison took place, the following circuit is established:

*Coil P(HS4).*—The −40 v. line side, through P(HS4), normally closed contacts R34AL, plug socket EJ, plug wire to socket QLJ, contacts QL3, start relay contacts R17B, and cam contacts CR1, to the common line side C.

Contacts B of relay HS4 close, whereby coil H of HS4 is energized via normally closed relay contacts H34B. Relay HS4 opens its contacts HS4A (Fig. 3f) breaking the circuit path of clutch magnets EM, PFM, and SFM to the line side C. Accordingly, all the cards will remain at rest at the end of the cycle. To bring these clutch magnets again into circuit, key contacts ERK (Fig. 3f) are closed, establishing the circuit of relay R34 which is held by its stick contacts AU and primary cam contacts P4. Relay 34 opens contacts R34AL and R34B, so that relay HS4 is deenergized. Contacts HS4A reclose, reconnecting the clutch magnets into the circuit path to line side C.

It will be assumed in the following description that the columns of the primary card chosen as sequence control values are the same columns to be compared with the columns on the secondary cards. In other words, the control values on all the cards may be considered to be group indicating values. Comparisons will be made to distribute the primary and secondary cards according to whether they have corresponding group data and under further control of the group data in successive primary cards.

Operations during successive cycles will now be considered.

As described in Section 3, to start operations, the start key (Fig. 3b) is depressed. Relay R17 thereby is energized. Contacts R17B (Fig. 3f) close, and circuits of clutch magnets PFM, EM, and SFM are then established. Primary and secondary cycles ensue, during which the first cards are fed out of the hoppers PH and SH (Fig. 1) to positions behind the Sequence and Secondary stations, respectively. During the primary cycle, clearing relay D1 (Fig. 3d) is energized, and during the secondary cycle, similar relay D2 is energized. Also, the start interlock relays D3 and D4 are energized, as well as the feed interlock relay FIR.

The start key is held down, whereby relay R17 is maintained energized. The second primary and secondary cycles ensue, during which the first cards are fed through the Sequence and Secondary stations, respectively, while the next cards are fed from the hoppers. Relays R5, R7, R8, R9, R14, and R15 (Fig. 3b), are energized, as was described in Section 3. Contacts R7B (Fig. 3a) shift, enabling the first primary card to be analyzed as it feeds through the Sequence station. Contacts R5A close, whereby the first secondary card is analyzed as it traverses the Secondary station. Contacts R6B still are in normal status, so that the Primary station sensing circuits cannot form yet. Accordingly, there is present at the Primary station the equivalent of a blank card, whereby relays PQZ and PBR (Fig. 3e) are energized. Assuming the sequence control field of the first primary card is not blank, relay QBZ is not energized. Under these conditions, potential will be transmitted during the comparing period, spanned by closure of cam contacts CR18, to the upper line U (Fig. 3d), resulting in energization of relay QH. Since relay QL is not energized, the sequence error relay HS4 (Fig. 3f) is not picked up, and the clutch circuit common path is not broken by the opening of contacts HS4A. During the travel of the first secondary card through the Secondary station, the values in its control field are sensed to selectively operate the group of secondary storage relays (Figs. 3a and 3c). Not until a next secondary cycle is performed will the operated storage relay or relays be cleared. In short, normally closed relay contacts D2A (Fig. 3c) will not open until a next secondary cycle is performed, whereby the hold coil or coils of the secondary group of storage relays will remain energized until then. It may be noted that relay PBR, having been energized, a dual run selection circuit (Fig. 3e) will be established to line P "lo," and as a result relay PL will be energized. The only effect of this is to allow a primary cycle to be initiated. However, the third primary cycle will take place in any event if the start key is held down, for reasons indicated in Section 3.

With the start key held down to maintain start relay R17 energized, a third primary cycle is performed. Thereafter, the start relay will be retained in energized status, and the start key may be released. There is no circuit path which may be closed at this time through the secondary cycle clutch magnet SFM. Consequently, the first secondary card remains at the eject position. During the third primary cycle, the first primary card feeds through the Primary station. Early in this cycle, cam contacts P2 (Fig. 3d) open whereby coil H(QH), previously energized, is dropped. As the first primary card feeds through the Primary station, the second primary card traverses the Sequence station. Before the sensing period starts, relay R6 (Fig. 3b) is energized, subsequently followed by operation of relays R12 and R13, as described in Section 3. Contacts R6B (Fig. 3a) shift, enabling the first primary card to be analyzed as it travels through the Primary station. Accordingly, the Primary groups of storage relays (Figs. 3a and 3c) are selectively energized according to control values to be compared with values derived from the first secondary card and which are now stored in the secondary groups of storage relays. The primary and dual run comparisons take place after the sensing period of the third primary cycle. Assume the primary, control data to be superior to the secondary control data. Hence, relay SL (Fig. 3e) will be energized. Contacts SL1 (Fig. 3f) close, whereby a circuit makes from the —40 v. line side through secondary clutch magnet SFM, contacts R4A, plug connection BS, contacts SL1, HS4A, R17B, and CR1 to the common line side. Hence, a new secondary cycle will be performed, subsequent to the completion of the present primary cycle. The first secondary card, now at the eject station, will be fed during the new secondary cycle to a selected pocket. The contacts SL3 (Fig. 3f) now are closed and will remain closed until cam contacts CR18 open, which does not occur until after the secondary card at the eject station is in coaction with the guide blades 306 and 307 (Fig. 1). With contacts SL3 (Fig. 3f) closed, a circuit is established from the —40 v. side, through pocket selecting magnet SRM1 (also see Fig. 1), a plug connection made to the plug socket SLJ, and thence via contacts SL3, R17B, and CR1, to the common line side C. Energization of magnet SRM1 causes the secondary card to be fed into pocket 4 (Fig. 1), as described in Section 2. This conforms to the requirement that the unmatched secondary cards be distributed to pocket 4. During the new secondary cycle, the second secondary card will be fed through the Secondary station. Before this time, the relay D2 (Fig. 3d) will be energized, and its contacts D2A (Fig. 3c) will open to serve, together with subsequently opening cam contacts CR14, to clear the secondary group of storage relays. In the assumed example, there is no circuit path closed through the clutch magnet PFM (Fig. 3f); hence, the first primary card will remain at the eject position. The primary group of storage relays will be maintained in selectively operated status, storing the control values derived from the first primary card during the last primary cycle. Since a new primary cycle is not performed, contacts P2 (Fig. 3d) do not open and the energized one of the coils H of the sequence or primary run comparison result relays QH, QE, and QL remains in energized status. It is assumed, however, that relay QL was not energized, for if it had been, then the new secondary cycle also could not have been initiated, as contacts HS4A would have been opened.

During the new secondary cycle, the control data on the second secondary card are sensed and compared with the stored control data derived from the first primary card. Assume the primary stored data to be inferior to the new secondary data. Accordingly, the relay PL (Fig. 3e) will be energized. Contacts PL1 and PL2 (Fig. 3f) close and enable circuits to be made through the clutch magnets PFM and EM. The circuit for magnet PFM, and parallel relay HS3, extends through contacts R2AL, plug connection BP, and contacts PL2, HS4A, R17B, and CR1. The circuit for eject magnet EM extends through HS3A, HS4A, R17B, and CR1 or through R12AL (now closed), plug connection BE, contacts PL1, HS4, R17B, and CR1. Contacts PL3 also being closed, a circuit is established from the —40 v. side, through pocket 1 selecting magnet PRM (also see Fig. 1), plug connection to socket PLJ, and via contacts PL3, R17B, and CR1, to side C. Accordingly, a new primary cycle and also the eject operation are initiated, whereby the first primary card will be ejected to the pocket 1 and the second primary card will be fed through the Primary station. Ejection of the first primary card to pocket 1 (Fig. 1) conforms to the requirement that unmatched primary cards be sent to pocket 1. During the primary cycle, the clearing relay D1 (Fig. 3d) is energized, contacts D1A are opened, and upon opening of cam contacts CR13 (Fig. 3c), the primary storage relays are cleared. Also, the cam contacts P2 will open early in the primary cycle, whereby the coil H of relay QH or QE (Fig. 3d) will be deenergized. There is no circuit path which is completed through magnet SFM under the assumed conditions. Hence, the second secondary card remains at the eject station and its control value stays in storage.

During the new primary cycle, the control values on the second primary card are sensed, stored, and compared with the secondary values, derived from the second secondary card and now stored in the secondary storage relays. Also, the sequence control values in the second and third primary cards are sensed and compared. Assume that the dual run control values match. Hence, relay PES (Fig. 3e) is energized. It is desired in the merging operation, under discussion, to send the matched primary and secondary cards to pocket 2 but with the secondary cards of a group behind all the primary cards of the same group. If the primary card directly following one found to match with the secondary is in the same group, the secondary card must be held at the eject station until a new primary group is detected. When successive cards in the primary run agree, relay QE (Fig. 3d) is energized. When both the relays QE and PES are energized in the same cycle, a secondary cycle will not be initiated but further primary and eject cycles will be initiated. The secondary cycle will not occur although contacts PES2 (Fig. 3f) are closed because the opening of contacts QE2 is sufficient to break the circuit path to the secondary clutch magnet SFM. On the other hand, new primary and eject cycles will be initiated. The circuit of magnet PFM, and relay HS3, now extends via contacts R2AL, plug connections BP and BM, contacts PES1, HS4A, F17B, and CR1. The magnet EM is energized as before, with contacts PES1 replacing the contacts PL1 in one of the EM circuits. Hence, the matching primary card at the eject position will be sent to a selected pocket. The contacts PES3 are not plugged up for the merging operation. If it has been desired to split the matched primary and secondary groups, then socket PESJ, connected to contacts PES3, would have been plugged to the magnet SRM2, whereby in an eventually occurring secondary cycle, the matched secondary card would have been sent to pocket 3. But the matched primary card is sent to pocket 2 in any event, during the primary cycle.

Also, during the latest primary cycle, the third primary card is fed through the Primary station. New sequence control and dual run comparisons take place. The comparison relay PES will necessarily operate again since the third primary card is assumed, in this discussion, to be in the same group as the second primary card which was found to be in the same group as the secondary card, the group data on which are now present in the secondary storage relays. Assume this time that the primary run or sequence comparison finds that the primary card fed through the sequence station is in a higher group. Therefore, relay QH (Fig. 3d) is energized, along with the dual run comparison result relay PES. A circuit thereby is enabled to make from the −40 v. side, through the magnet SFM, contacts R4A, plug connection BS, contacts QH1, QE2, and PES2, HS4A, R17B, and CR1, to side C. Also, circuits make, as before, through the magnets PFM and EM. Hence, primary and secondary cycles will occur simultaneously, and the eject operation also will occur. Since none of the pocket selecting magnets has been energized, the primary and secondary cards will feed to pocket 2. The primary card at the eject position is below the secondary card at the eject position; hence, the primary card travels under the secondary card to pocket 2.

Operations continue as described until a secondary or primary card fails to feed. Assume, for instance, that a primary card is fed to the Primary station but there is no following primary card. Consequently, relays R7, R14, and R15 (Fig. 3b) will not be energized. The equivalent of a blank control field is thus presented at the Sequence station. The primary run comparison therefore will result in energization of relay QL (Fig. 3d). Relay HS4 will be energized as described before. A dual run comparison also will have been made, but this will be dropped upon the opening of CR18. Since contacts HS4A are open, new primary and secondary cycles will not be initiated. The key ERK may then be operated to energize relay R34, whereby relay HS4 will be dropped. Contacts HS4A will reclose to enable clutch magnet circuits to be closed. Near the end of the last primary cycle, relay R6 (Fig. 3b) was deenergized. The relays R7, R14, and R15 also are in deenergized status. The relays R12 and R13, as well as relays R8 and R9 are still energized. The primary and secondary storage relays still retain their previously stored values. Primary and dual run comparisons occur. The primary run comparison can result only in the repeat energization of relay QL. The dual run comparison repeats the previous result. If this result is low secondary card, then relay SL (Fig. 3e) is energized, whereby magnet SFM will be energized. A secondary cycle will occur and the secondary card will be ejected to pocket 4 since magnet SRM1 is plugged to contacts SL3. If the result is low primary, then contacts PL1 enable the circuits of magnets EM and PFM (also HS3) to make. Assuming there are no more cards in the hopper PH, relay R2 (Fig. 3b) will be in energized status, whereby contacts R2AL (Fig. 3f) will be open. But a circuit path will be closed via the shifted contacts R12AU between wires w2 and w1, allowing the circuits of magnet PFM and HS3 to be completed, if contacts PL1 are closed. The leading primary card will be ejected to pocket 1. If the dual run comparison shows a matching condition, the circuits of magnets PFM and HS3, and of EM make as before but with contacts PES1 taking the place of contacts PL1. Since contacts PL3 are closed, and plugged to magnet PRM, the leading primary card will be sent to pocket 2. The circuit of magnet SFM will have been made via PES2, QE2, and QL1. The secondary card will then be sent to pocket 2, behind the primary card. During the primary cycle which is performed following the depression of key ERK, cam contacts P4 open and break the stick circuit of relay R34.

Assume the last primary card has been ejected while a secondary card is fed through the Secondary station. Under this condition, the relays R7, R14, R15, R6, R12, and R13 (Fig. 3b) all are in deenergized status. With relays R12 and R14 not energized, normally closed contacts R12BL and R14AL enable the circuit of relay FIR (Fig. 3d) to make. The primary run comparison indicates an equal condition since the equivalent of a blank card condition is present at each of the Sequence and Primary stations. Relay QE therefore is energized. Assuming there is a value of any magnitude in the control field of the secondary card, the dual run comparison will place potential on wire P "lo" (Fig. 3e). The potential will be fed to tube V81 and also via shifted contacts "a" and "c" of relay FIR to tube V83. Accordingly, relays PL and SL both will be energized. With relay SL energized, magnet SRM1 is energized and also clutch magnet SFM. The secondary card therefore will be sent to pocket 4. There will be no primary cycle because with no cards present in hopper PH, relay R2 is energized and its contacts R2AL are open. Also, relays R12 and R14 are now in deenergized status and card lever contacts PCL are open. Thus, there is no circuit path between wires w2 and w1, whereby magnets PFM and HS3 cannot be energized. Also, since contacts R12AL are open, there is no circuit completed through magnet EM.

It was assumed for the last dual run comparison that the secondary card was not blank in its control field. If it were blank, then the potential would be placed on wire E "out" but transmitted via now-closed contacts FIRc to tube V83 and via shifted contacts FIRa to tube V81. Thus, relays PL and SL would be energized just as before and the secondary card would be treated as an unmatched secondary card and sent to pocket 4.

If the conditions were reversed with respect to the card feeds; that is, if the last secondary card had been ejected and a primary card had been fed through the Primary station, the results would be as follows: The relays R5, R8 and R9 (Fig. 3b) would be in deenergized status, the relay R4 would be in energized status, relay FIR would be energized by way of contacts R8AL (Fig. 3d), and card lever contacts SCL (Fig. 3f) would be open. With relay FIR energized, if the primary card were blank in the control column, then relays PL and SL would be energized in the manner previously described. If the primary card were not blank, the potential on wire S "lo" would be led to tube V83 and also by way of now-operated contacts FIRc and FIRa to tube V81. Accordingly, relays PL and SL would be energized. Although contacts SL1 would be closed, there is no circuit which may be completed to magnet SFM since contacts SCL and R4A are open and the contacts R9B are in normal state. With contacts PL1 closed, the circuits of magnets HS3, PFM, and EM will make. Also, the circuit of magnet PRM will make by way of contacts PL3. Thus, the primary card will be ejected to pocket 1, being treated as an unmatched card even if it should be blank in its control field.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a collator for handling primary and secondary record cards having columns of zone and intrazone index positions perforated according to a combinational code to represent alphabetic or numeric or alphabetic-numeric data in a field of denominationally ordered columns, each character of such data having a value position in a prescribed value scale, a numeric character being represented by a single perforation in a column in an intrazone index position, the zero being represented by a single perforation in a column in a zone index position, a special character being represented by a single perforation in a column in another zone index position, an alphabetic character being represented by a combinational pair of perforations in zone and intrazone positions, and a blank column also having a value position within the prescribed scale; means to feed the primary and secondary cards along primary and secondary courses, respectively, sensing means in each course for sensing one card at a time for perforated index positions, primary and secondary groups of storage relays operated under control of the primary and secondary card sensing means, respectively, to store the numeric and alphabetic data sensed on the cards, supplemental relays operated under control of the primary and secondary groups of storage relays for detecting blank columns in the sensed primary and secondary cards and also special perforation relations in these cards, means controlled by the primary and secondary groups of storage relays and further controlled by the supplemental relays for ascertaining the relative magnitude of the data, derived from the primary and secondary cards, in conformity to the prescribed scale of values of the blank column value and the other characters which may be represented on the cards, and means controlled by the relative magnitude ascertaining means for selectively directing the primary and secondary cards to card destinations.

2. In a collator for handling primary and secondary record cards having columns of zone and intrazone index positions perforated according to a combinational code to represent alphabetic or numeric or alphabetic-numeric data in a field of denominationally ordered columns, such data being composed of characters and possible blank columns all of which have value positions in a prescribed value scale, a numeric character, except the zero, being represented by a single perforation in a column in an intrazone index position, the zero being represented by a single perforation in a column in a 0 zone position, a special character being represented by a single perforation in a column in an R zone position, and alphabetic characters being represented by pairs of perforations in the columns, one component perforation being in a zone position of a column and the other component perforation of the pair being in an intrazone position of the column; means for feeding the primary and secondary cards along different courses, respectively, means in each course to sense one card at a time for perforations, storage relays controlled by each sensing means to store the data represented by the perforations in sensed primary and secondary cards, supplemental relays controlled by the storage relays for manifesting blank column conditions or the conjoint presence of perforations in the 0 positions of columns of the primary and secondary cards or of a 0 or R perforation in a column of either card and a 0 zone alphabetic character in a comparable column of the other card, means controlled by the storage relays and the supplemental relays for ascertaining the relative magnitude, in conformity to the prescribed value scale, of the data derived from a pair of primary and secondary cards, and means controlled by the relative magnitude ascertaining means for selectively distributing the primary and secondary cards to card receiving destinations.

3. In a collator for handling records having columns of index positions perforated to represent characters which, as well as a blank column, have value positions in a prescribed value scale; means to feed two files of such records along two courses, sensing means in each course for sensing one card at a time for perforated index positions, storage relays controlled by the sensing means to store the characters represented on sensed cards in the two courses, supplemental relays controlled by the storage relays for detecting blank column conditions in the sensed cards, means controlled by the storage relays and supplemental relays for ascertaining the relative magnitude, consistent with the prescribed scale, of data derived from record cards in the two courses, and means controlled by the relative magnitude ascertaining means for collating the cards.

4. In a machine for distributing records having columns of index positions, a blank column representing one value in a prescribed value scale, a column representing any one of a plurality of other values in the scale when marked in any one only of a plurality of index positions of the column, and a column representing any one of a plurality of still other values in the scale when marked in any one of a plurality of combinations of index positions of the column; means to sense the index positions of a pair of such records, relay devices operable under control of the sensing means according to the marked positions on the pair of records, correction relays selectively operated under control of said relay devices to manifest blank column conditions on the pair of records and special relations of marked positions in comparable columns of the pair of records, means controlled by said relay devices and by the correction relays for selectively producing comparison results which are dependent on the relation of values represented on the pair of cards and which are correct in accordance with the prescribed scale by reason of the control exercised by the correction relays, and record distributing means operating under control of the comparison results producing means for distributing the records according to the comparison results.

5. In a collator through which primary and secondary records are run to be selectively distributed to record receiving stations, such records having columns of index positions marked to represent desired data; means at a secondary sensing station for sensing the cards in the secondary run, one card at a time, means at a primary station for sensing the cards in the primary run, one at a time, means at a sequence station for sensing the cards in the primary run, one record at a time concurrently with the sensing of a preceding record in the primary run at the primary station, primary storage relays and secondary storage relays controlled by the sensing means at the primary and secondary stations respectively for storing data represented on primary and secondary records, sequence relays controlled by the sensing means at the sequence station according to marked index positions in a primary card at the sequence station, dual run comparing means controlled by the primary and secondary storage relays for comparing the data on the primary and secondary cards, primary run comparing means controlled by the primary storage relays and the sequence relays for comparing the data on successive primary cards, and means jointly controlled by the dual run and primary run comparing means for selectively distributing the cards of both runs to record receiving destinations, and correction relays for the dual run and the primary run comparing means to enable the comparison results to be consistent with a prescribed scale of values, circuits controlled jointly by the primary and secondary storage relays upon the occurrence of special relations of marked index positions in the primary and secondary records for operating the correction relays for the dual run comparing means, and circuits controlled jointly by the same primary storage relays and by the sequence relays for operating the correction relays for the primary run comparing means upon the occurrence of said special relations of marked index positions in the successive primary records.

6. In a collator having means to sense records, fed along different courses, for representations of characters having assigned value positions in a given sequence value scale, such characters being represented according to a chosen code by singly or combinationally marking index positions in columns of the records; a group of devices related to each course and selectively set singly and in combination under control of the sensing means in the course accordingly to singly and combinationally marked index positions in the columns of the record sensed in the course, a first comparing means rendered effective by the groups of devices related to the different courses for comparing records sensed in the different courses to manifest the presence of special sequential position of characters in the records, of which one character is represented by a single marked index position in a column of one of the compared records and of which the other character is represented by a combination of marked index positions in a column of another of the compared records, a second comparing means jointly rendered effective by said groups of devices and by the first comparing means for ascertaining the relative magnitude, consistent with the given scale, of the characters represented according to said combinational code on the compared records, and record distributing means controlled selectively by said ascertaining means according to the ascertained relative magnitude.

7. In a machine to distribute records having columns of index positions selectively marked singly and in combination, according to a given code, to represent characters having assigned values in a prescribed value scale; means to sense a pair of such records for marked index positions, devices operated under control of the sensing means in accordance with the marked index positions on the pair of records, a first comparing means rendered effective by said devices to manifest special comparative relationships of marked index positions in the compared records, a second comparing means jointly rendered effective by the first comparing means and by the same said devices for ascertaining the relative magnitude, consistent with the prescribed scale, of the characters represented, according to said code, on the pair of records, and record distributing means selectively operating under control of the second comparing means in accordance with the relative magnitude ascertained thereby.

8. In a machine to distribute records having columns of index positions selectively marked singly and in combination, according to a given code, to represent characters having assigned values in a prescribed value scale; means to sense a pair of such records for marked index positions, devices operating under control of the sensing means in accordance with the character representations sensed on the pair of records, a first comparing circuit closed by said devices to detect a predetermined comparative relation between the pair of records as to certain marked index positions, each of which occurring alone in a column represents one character and occurring in combination of marked index positions in a column serves as a component of a different character representation, a second comparing circuit separately closed by the same said devices and by the first comparing circuit for ascertaining the relative value magnitude, consistent with the prescribed scale, of the characters represented by singly or combinationally marked index positions on the pair of records and record distributing means selectively operating under control of the second comparing circuit in accordance with the ascertained relative value magnitude.

9. In a collator for handling records having columns of index positions, a column having a single perforation in only one index position representing one value in a partly normal and a partly arbitrary scale of sequence values and when perforated in a combination of such index positions representing a different value in said sequence scale; means to feed such records along two different courses; sensing means in each course for sensing the sequence perforations in said records, one record at a time; devices set under control of the sensing means to represent the normal sequence values of perforations sensed in a pair of records, one from each course; supplemental means set under control of said devices to manifest special arbitrary comparative sequence value relations represented in said pair of records by perforations in said index positions, comparing means responding to the sequence values set in said devices and said supplemental means for ascertaining the relative magnitude and position in said scale of values represented by single perforations or combinations of perforations in the pair of records, and means controlled by the comparing means for selectively directing the records of the two courses to record receiving destinations in accordance with said scale.

10. In a machine for distributing records having columns of index positions for receiving value designations, a blank column having one arbitrary value in a prescribed arbitrary value scale, a column having a designation in one index position representing a different arbitrary value in said scale, and a column having designations in a combination of index positions representing still another arbitrary value in the prescribed scale; means to sense the designations in the index positions of a pair of such records, electrical devices set under control of the sensing means according to the designations in the index positions on the pair of records, electrical correction means selectively set in response to a blank column condition on either record or in response to the arbitrary value relation designation in index positions on a pair of records, means controlled by the aforementioned devices and the correction means for ascertaining the relative position of the designated values on said pair of records on the prescribed value scale, and record distributing means controlled selectively by said ascertaining means for distributing the records to destinations according to the actual positions of designated arbitrary values in said scale.

11. In a machine for distributing records having columns of zone and intrazone index positions, each column receiving value designations representing a series of different values in a prescribed arbitrary value scale depending on whether said column is designated in a single zone or in an intrazone position or in a combination of zone and intrazone positions; means to sense a column in each of a pair of such records for designations in said index positions, storage means set under control of the sensing means according to the designations in zone and intrazone index positions of the respective columns of said pair of records, correction means set selectively under control of said storage means to manifest the presence of a designation occurring alone in a zone position in a column of either record and also of such zone designation occurring with or without an accompanying intrazone designation in a column of the other record, comparing means controlled jointly by the storage means and the correction means for ascertaining the sequence relation in the prescribed scale of the values designated in said pair of records, and record distributing means controlled by said comparing means for distributing the records selectively in accordance with their relative positions in said arbitrary scale.

12. In a cyclically functioning machine for handling records having index positions marked to designate desired data, a sensing circuit including an element for opening and closing said circuit according to marks in the index positions of a record at differential times in a cycle, an electronic tube including a control electrode, means connecting the control electrode to the sensing circuit to be pulsed upon the sensing of any marked index position by said element so as to tend to render the tube conductive, a plurality of item storage relays, circuits for the relays adapted to be closed through said tube when rendered conductive, said circuits having a common connection to the tube but individually including switches intended to be closed at selected differential times such that upon the sensing of a marked index position at the same differential time as that in which a switch is closed, current flows through said tube and the relay connected to the switch, whereby the latter relay is energized, and cyclically operating means for closing said switches at the proper differential times such that the relays may selectively store different items corresponding to the index positions.

13. A machine including a circuit having a device to selectively open and close said circuit to produce differentially timed electrical designation signals, an electronic tube responsive to said circuit including a controlling electrode, means connecting the controlling electrode to said circuit to be pulsed upon the production of a differentially timed designation signal by said device so as to tend to render the tube conductive, a plurality of designation storage relays, circuits for the relays adapted to be closed through said tube when rendered conductive, said circuits having a common connection to an output electrode of the tube but individually including switches closed at selected differential times, such that upon the first mentioned circuit producing a designation signal at the same differential time as that in which a switch is closed, current flow is produced through the tube and the relay connected to the switch, whereby the latter relay is energized, and means for closing said switches at the proper differential times such that the relays may selectively store different designations corresponding to the designation signals.

BYRON E. PHELPS.
JAMES D. HOOD.

REFERENCES CITED

The following references are of record in the file of this patent:

UNITED STATES PATENTS

| Number | Name | Date |
| --- | --- | --- |
| 1,862,032 | Pierce | June 7, 1932 |
| 1,982,216 | Lowkrantz | Nov. 27, 1934 |

(Other references on following page)

UNITED STATES PATENTS

| Number | Name | Date |
|---|---|---|
| 2,189,024 | Bryce | Feb. 6, 1940 |
| 2,220,500 | Torkelson | Nov. 5, 1940 |
| 2,243,474 | Bryce | May 27, 1941 |
| 2,268,447 | Gehrtman | Dec. 30, 1941 |
| 2,302,081 | Weitman | Nov. 17, 1942 |
| 2,307,100 | Blakely | Jan. 5, 1943 |
| 2,337,553 | Hofgard | Dec. 28, 1943 |
| 2,350,888 | Hall | June 6, 1944 |
| 2,377,783 | Hood | June 5, 1945 |
| 2,379,828 | Rubidge | July 3, 1945 |
| 2,411,645 | Whetstone | Nov. 26, 1946 |
| 2,420,167 | Dickinson | May 6, 1947 |
| 2,434,512 | Page et al. | Jan. 13, 1948 |